United States Patent
Nishino et al.

(10) Patent No.: US 7,404,341 B2
(45) Date of Patent: Jul. 29, 2008

(54) TRANSMISSION SYSTEM FOR TRACTOR

(75) Inventors: Akifumi Nishino, Sakai (JP); Hajime Shikiya, Kishiwada (JP); Kiyoshige Maezawa, Kishiwada (JP); Shigeo Shoen, Osaka (JP); Kenzo Ushiro, Sakai (JP); Keita Ono, Sakai (JP)

(73) Assignee: Kubota Corporation, Osaka (JP)

( * ) Notice: Subject to any disclaimer, the term of this patent is extended or adjusted under 35 U.S.C. 154(b) by 143 days.

(21) Appl. No.: 10/936,435

(22) Filed: Sep. 8, 2004

(65) Prior Publication Data
US 2005/0204843 A1    Sep. 22, 2005

(30) Foreign Application Priority Data
Mar. 22, 2004  (JP)  ............................... 2004-083116
Mar. 22, 2004  (JP)  ............................... 2004-083117

(51) Int. Cl.
*F16H 3/08* (2006.01)
*F16H 37/00* (2006.01)
*F16H 37/02* (2006.01)
*B60K 25/02* (2006.01)

(52) U.S. Cl. ...................... 74/331; 74/15.63; 74/606 R; 180/53.7

(58) Field of Classification Search ................. 74/15.2, 74/15.63, 15.66, 15.84, 15.86, 15.88, 329, 74/331, 718, 720, 665 G, 606 R; 180/56.4, 180/53.7–53.8
See application file for complete search history.

(56) References Cited

U.S. PATENT DOCUMENTS

| | | | | |
|---|---|---|---|---|
| 4,716,775 A | * | 1/1988 | Horii et al. ................. | 74/15.86 |
| 4,794,807 A | * | 1/1989 | Horii et al. ................. | 74/15.84 |
| 5,901,606 A | * | 5/1999 | Umemoto et al. .......... | 74/15.66 |
| 5,913,950 A | * | 6/1999 | Matsufuji ................... | 74/730.1 |
| 5,947,218 A | * | 9/1999 | Ishimaru .................... | 180/53.1 |
| 6,003,391 A | * | 12/1999 | Kojima et al. .............. | 74/15.66 |
| 6,119,552 A | * | 9/2000 | Matsufuji ................... | 74/606 R |
| 6,199,441 B1 | * | 3/2001 | Kanenobu et al. .......... | 74/331 |

FOREIGN PATENT DOCUMENTS

| | | |
|---|---|---|
| EP | 1 334 861 A1 | 8/2003 |
| FR | 2 434 730 | 3/1980 |

(Continued)

OTHER PUBLICATIONS

French Preliminary Search Report.

*Primary Examiner*—Roger Pang
(74) *Attorney, Agent, or Firm*—The Webb Law Firm

(57) ABSTRACT

A transmission system for transmitting power through a traveling transmission line and also through a PTO transmission line is disclosed. The system includes a clutch housing and a base transmission case connected via a housing frame. The base transmission case includes a front end opening and a rear end opening. A differential case is connected to the rear end opening. The front end opening is selectively connected with either a gear change speed case having a gear change speed mechanism or an HST case having an HST mechanism. When the gear change speed mechanism is selectively used, a PTO power output portion communicates with the PTO transmission line and a traveling power output portion communicates with the traveling transmission line. When the HST mechanism is selectively used, a pump shaft communicates with the PTO transmission line and a motor shaft communicates with the traveling transmission line.

16 Claims, 22 Drawing Sheets

FOREIGN PATENT DOCUMENTS

| | | | | |
|---|---|---|---|---|
| JP | 05-178103 | 7/1993 | | |
| JP | 05-280615 | 10/1993 | | |
| JP | 405280615 A | * 10/1993 | ................ | 74/606 R |
| JP | 406191301 A | * 7/1994 | ................ | 180/53.4 |
| JP | 09-184559 | 7/1997 | | |
| JP | 11 334396 | 7/1999 | | |
| JP | 2001-018672 | 1/2001 | | |
| JP | 2002-084804 | 3/2002 | | |
| JP | 2002-127766 | 5/2002 | | |
| JP | 2002-301940 | 10/2002 | | |

* cited by examiner

TRANSMISSION SYSTEM FOR TRACTOR

BACKGROUND OF THE INVENTION

1. Field of the Invention

The present invention relates to a transmission system for a tractor, adapted for transmitting power of an engine to axles through a traveling transmission line and also to an externally mounted utility implement through a PTO transmission line.

2. Description of the Related Art

Tractors selectively employ a gear change speed mechanism or an HST (hydrostatic transmission) mechanism as a traveling change speed mechanism, whichever is appropriate. In recent years, however, different types of transmission systems are required to cope with a variety of works. If different types of transmission systems of respectively desired types are to be provided, this results in increase in the types of transmission cases to be prepared therefor, thus leading to disadvantageous cost increase for preparing molds used for casting the cases.

Then, in an attempt to reduce the mold costs, e.g. the Japanese Patent Application "Kokai" No. 2002-127766 (FIGS. 3, 4 and 14) proposed to utilize a case construction which can be used for both the gear type change speed mechanism and the HST change speed mechanism.

More particularly, this transmission system is provided as a "mono-body" vehicle construction comprising an assembly of a clutch housing 7 and a transmission case 9 formed by casting, which are interconnected via a center plate 12. With this construction, however, either the gear change speed mechanism or the HST mechanism needs to be housed within a limited space of a fixed shape formed inside a rear portion of the clutch housing 7. Hence, this construction imposes restriction in the choice of the gear change speed mechanism or the HST mechanism which can be housed within such limited space.

SUMMARY OF THE INVENTION

A primary object of the present invention is to provide, at lower costs, a transmission system adapted for multiple types, by using a common transmission case, in particular, such system which is capable of selectively mounting a gear change speed mechanism or an HST mechanism therein.

For accomplishing the above-noted object, according to the present invention, there is proposed a transmission system for a tractor, adapted for transmitting power of an engine to axles through a traveling transmission line and also to an externally mounted utility implement through a PTO transmission line, the system comprising: a clutch housing disposed rearwardly of the engine; a base transmission case disposed and spaced rearwardly of the clutch housing; the clutch housing and the base transmission case being connected together via a housing frame, the base transmission case including an intermediate partitioning wall for partitioning an inner space of the case in a fore and aft direction to create a front space having a front end opening and a rear space having a rear end opening; a differential case connected to the rear end opening of the base transmission case; the front space including a receiving portion for the traveling transmission line and a receiving portion for the PTO transmission line, said traveling and PTO transmission lines being disposed parallel with each other;

wherein said front end opening is selectively connected with either a gear change speed case having a gear change speed mechanism for changing speed of the engine power and outputting the speed-changed power or an HST case having an HST mechanism for changing speed of the engine power and outputting the speed-changed power;

when the gear change speed mechanism is selectively used, a PTO power output portion of the gear change speed mechanism is connected end-to-end to the receiving portion for the PTO transmission line and a traveling power output portion of the gear change speed mechanism is connected end-to-end to the receiving portion for the traveling transmission line; and when the HST mechanism is selectively used, a pump shaft of the HST mechanism is connected end-to-end to the receiving portion for the PTO transmission line and a motor shaft of the HST mechanism is connected end-to-end to the receiving portion for the traveling transmission line.

According to the above-described construction, by attaching the gear change speed case to the front end opening of the base transmission case, there can be realized the one type of change speed transmission system which effects gear change speed operation for providing multiple stages of traveling speeds. On the other hand, by attaching the HST case to the front end opening of the same base transmission case, there can be realized the further type of change speed transmission system which effects stepless change speed operation for changing the traveling speed in a stepless manner. Hence, this construction can contribute to cost reduction by allowing use of a same casting mold for casting the transmission case.

Further, the housing frame which interconnects the clutch housing and the base transmission case can be freely designed by its sheet metal construction. Therefore, the gear change speed case or the HST case connected to the front end opening of the transmission case can be largely free from any configuration limitation which determines its axial position, so that it becomes easier to provide a gear change speed case or an HST case of a particular type to suit e.g. a particular engine output requirement. As a result, in obtaining multiple types of transmission system through co-utilization of a same base transmission case, even greater freedom of choice can be obtained in the choice of the gear change speed mechanism and the hydrostatic stepless (HST) transmission mechanism. Moreover, as the front and rear ends of the base transmission case are opened, transmission mechanism elements can be easily mounted to the front and rear spaces partitioned in the fore and aft direction across the intermediate partitioning wall. Hence, this construction can contribute also to improvement in production efficiency.

Preferably, an auxiliary gear change speed mechanism constituting a part of the traveling transmission line is disposed within the rear space formed rearwardly of the intermediate partitioning wall in the base transmission case. With this construction, in either type of construction, the auxiliary gear change speed mechanism can be mounted at the same location. Hence, it becomes easier to increase the ratio of co-utilization of the elements of the auxiliary gear change speed mechanism of each type.

Preferably, a PTO clutch constituting a part of the PTO transmission line is disposed within the front space formed forwardly of the intermediate partitioning wall. With this, it becomes possible to provide a "live" PTO transmission line capable of selectively allowing or blocking power transmission to the implement as desired (i.e. a PTO transmission line independent of the traveling transmission line). Therefore, the utility implement coupled to the PTO transmission line can be driven or stopped at a desired timing to carry out a desired work appropriately.

Preferably, a mounting seat for a mid PTO case is formed on the lower end of the base transmission case. This allows the same base transmission case to selectively provide one type of construction having a mid PTO shaft or another type of construction not having the mid PTO shaft.

In the above construction, in the front space of the base transmission case, there can be mounted a transmission mechanism for operatively coupling the PTO transmission line and the mid PTO shaft and a PTO mode selecting mechanism for switching over between power take-off from a rear PTO shaft and power take-off from the mid PTO shaft. With this, the transmission system can selectively provide a mode for driving the rear PTO shaft alone, a further mode for driving the mid PTO shaft alone, a still further mode for driving both the rear PTO shaft and the mid PTO shaft, etc. as desired by the operator.

The clutch housing can incorporate therein a front wheel change speed mechanism for receiving power from a front wheel driving transmission shaft. With this, the transmission system can selectively provide a standard four wheel drive mode in which the front wheels are driven at a peripheral speed similar to that of the rear wheels or a front wheel accelerated drive mode in which the front wheels are driven at a peripheral speed sufficiently greater (e.g. 2 times greater) than that of the rear wheels, so as to allow the vehicle to make a small turn smoothly at e.g. a field edge without roughing up the field.

Further and other features and advantages of the present invention will become apparent upon reading the following detailed description of the preferred embodiments thereof with reference to the accompanying drawings.

DESCRIPTION OF THE PREFERRED EMBODIMENTS

Figure 1:
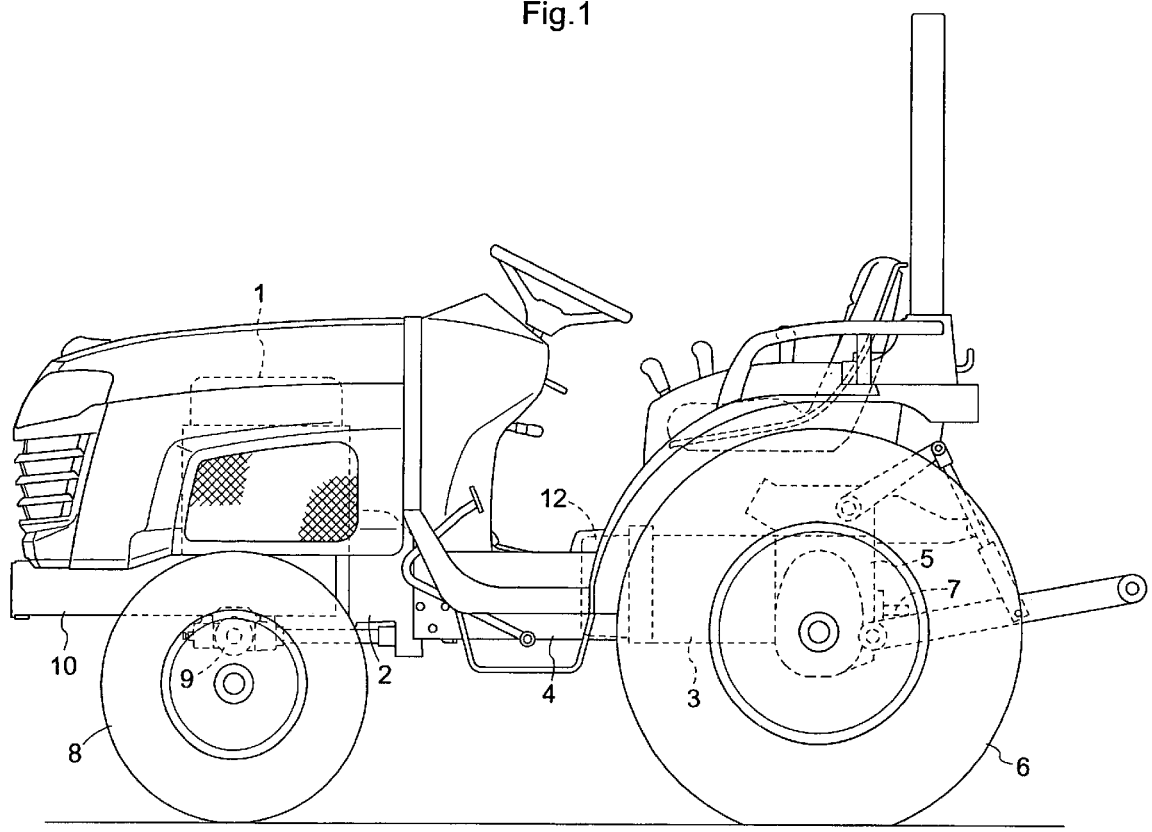
FIG. 1 is an overall side view of a tractor.
Figure 3:
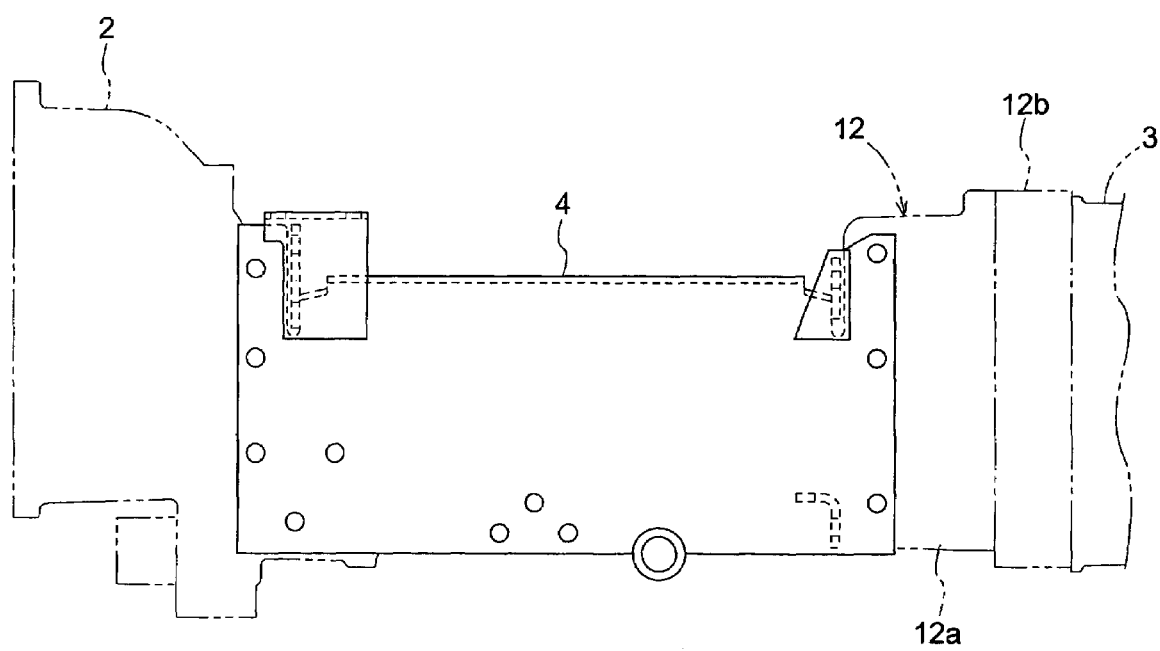
FIG. 3 is a side view of a vehicle construction.

FIG. 1 shows an overall side view of a four wheel drive agricultural tractor having a transmission system relating to the present invention. FIG. 3 shows a side view showing its vehicle construction. This tractor includes a vehicle body which comprises a clutch housing 2 connected to the rear of an engine 1, a base transmission case (to be referred to simply as "transmission case" hereinafter) 3, and a rear transmission case including a differential case 5, the housing 2, the transmission case and the rear transmission case being connected together via a housing frame 4 formed of sheet metal. The differential case 5 connected to the rear end of the transmission case 3 rotatably supports right and left rear wheels 6 and mounts a rear PTO shaft 7 projecting rearward. Further, a front axle case 9 having steerable right and left front wheels 8 is pivotally mounted to the bottom of a front frame 10 connected to the engine 1 to be capable of rolling action.

In this tractor, the same clutch housing 2, the same transmission case 3, the same differential case 5 and the same front axle case 9, which are all casting products, are adapted to be used for various types of transmission system, for the purpose of cost reduction of the case casting mold. Next, some examples of transmission system co-utilizing the cases above will be described.

FIRST EXAMPLE

Figure 4:
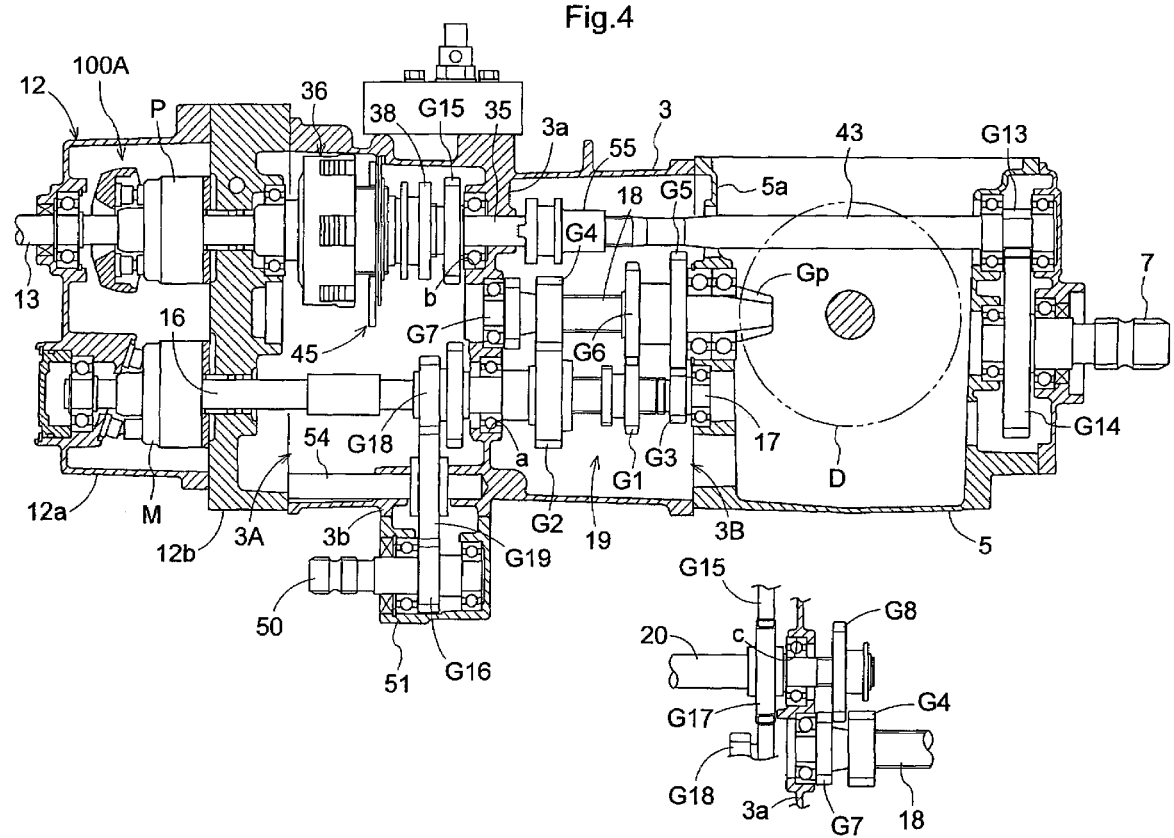
FIG. 4 is a side view in vertical section showing a first example of a transmission system.
Figure 5:
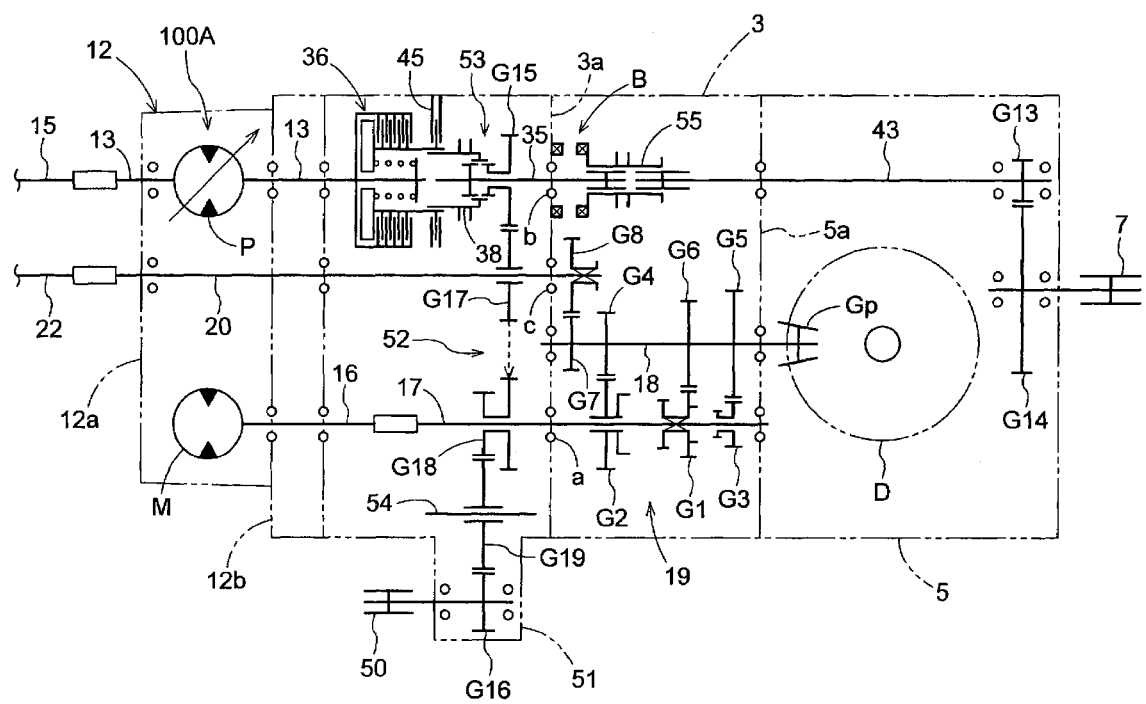
FIG. 5 is a schematic showing a gear train of the first example of the transmission system.

FIGS. 4 and 5 show a first example of transmission system. In this example, the clutch housing 2 houses, at an upper section thereof, a single-plate, dry type main clutch 11. And, a traveling HST case 12 is connected to a front end of a transmission case 3 constituting a rear transmission case portion. A rear end of the housing frame 4 is connected to this HST case 12. The HST case 12 includes a case body 12*a* having a rear opening and a thick port block 12*b* connected to the rear end of the body 12*a*. The upper section of the HST case 12 incorporates a variable displacement pump unit P which is constructed as the axial plunger type. The lower section of the case 12 incorporates a fixed displacement motor unit M which is also constructed as the axial plunger type. An input shaft 13 acting as a pump shaft is supported across the case body 12*a* and the port block 12*b*. And, a front projecting end of this input shaft 13 and a clutch output shaft 14 projecting rearward from the clutch housing 2 are coaxially and operably coupled to each other via a main transmission shaft 15.

An HST mechanism 100A incorporated in the HST case 12 has the well-known construction for driving the output shaft 16 of the motor unit M in steplessly variable speeds by changing an angle of a swash plate included in the pump unit P, thereby to vary the discharging amount and direction of the pressure oil, so that the output shaft 16 is driven in the forward or reverse direction in steplessly variable speed. This HST mechanism 100A is provided as a pedal-operated, main change speed mechanism for effecting stepless change speed and effecting also switchover between the forward drive and the reverse drive.

The transmission case 3 includes an intermediate partitioning wall 3a which partitions the inner space of the case 3 in the fore and aft direction to create a front space having a front end opening 3A and a rear space having a rear end opening 3B.

Then, this intermediate partitioning wall 3a forms, at lower and upper portions thereof, a shaft bearing portion (a) for the traveling transmission line and a shaft bearing portion (b) for the PTO transmission line, respectively. A transmission shaft 17 acting as an input portion for the traveling transmission line supported across the shaft bearing portion (a) and a front wall 5a of the differential case 5 and the output shaft 16 of the motor unit M are coupled co-axially to each other.

In the space formed rearwardly of the intermediate partitioning wall 3a, there is mounted a bevel pinion shaft 18 extending across the intermediate partitioning wall 3a and the front wall 5a of the differential case 5 and acting as a final-stage change speed shaft. Between this bevel pinion shaft 18 and the transmission shaft 17, there is mounted an auxiliary gear change speed mechanism 19 of the traveling transmission line. This auxiliary gear change speed mechanism 19 is constructed such that a shift gear G1 splined on the transmission shaft 17 is shifted to change the speed of the bevel pinion shaft 18 in three speeds, thereby to drive the right and left rear wheels 6 in variable speeds via a differential mechanism D meshing with a bevel pinion gear Gp.

More particularly, the transmission shaft 17 mounts, at front and rear portions thereof, a large free (loosely mounted) gear G2 and a small free (loosely mounted) gear G3. The bevel pinion gear 18 fixedly mounts a small gear G4 constantly meshed with the large free gear G2 and a large gear G5 constantly meshed with the small free gear G3. Further, the bevel pinion gear 18 fixedly mounts a mid (medium-sized) gear G6 capable of being directly meshed with the shift gear G1. In operation, when the shift gear G1 is shifted rearward to bring its boss portion to be engaged with a boss portion of the small free gear G3, there is provided a "low speed" under the transmission determined by a gear ratio between the small free gear G3 and the large gear G5. When the shift gear G1 is shifted to an intermediate position in the fore and aft direction to be directly meshed with the mid gear G6, there is provided a "middle speed" under the transmission determined by a gear ratio between the shift gear G1 and the mid gear G6. Further, when the shift gear G1 is shifted forwardly to bring its boss portion to be engaged with the boss portion of the large free gear G2, there is provided a "high speed" under the transmission determined by a gear ratio between the large free gear G2 and the small gear G4.

In the above-described manner, the bevel pinion shaft 18 is driven hydraulically in stepless manner in the forward or reverse direction and also driven in the three speeds by the auxiliary gear change speed mechanism 19. On the front end of this bevel pinion shaft 18, there is fixedly mounted an output gear G7 for power transmission to the front wheels 8. Further, the intermediate partitioning wall 3a and the HST case 12 include a front wheel drive shaft bearing portion (c), through which a front wheel drive transmission shaft 20 is supported. On the rear end of this front wheel drive transmission shaft 20, there is splined a shift gear G8. In operation, when this shift gear G8 is shifted forwardly to be meshed with the output gear G7 of the bevel pinion shaft 18, there is provided a four wheel drive condition wherein a front wheel drive power at a speed synchronized with a rear wheel drive speed is taken off this front wheel drive shaft 20. Whereas, when the shift gear G8 is shifted rearward to be released from its meshing with the output gear G7, there is provided a rear two wheel drive condition in which only the rear wheels 6 are driven while the front wheel drive is blocked.

Figure 2:
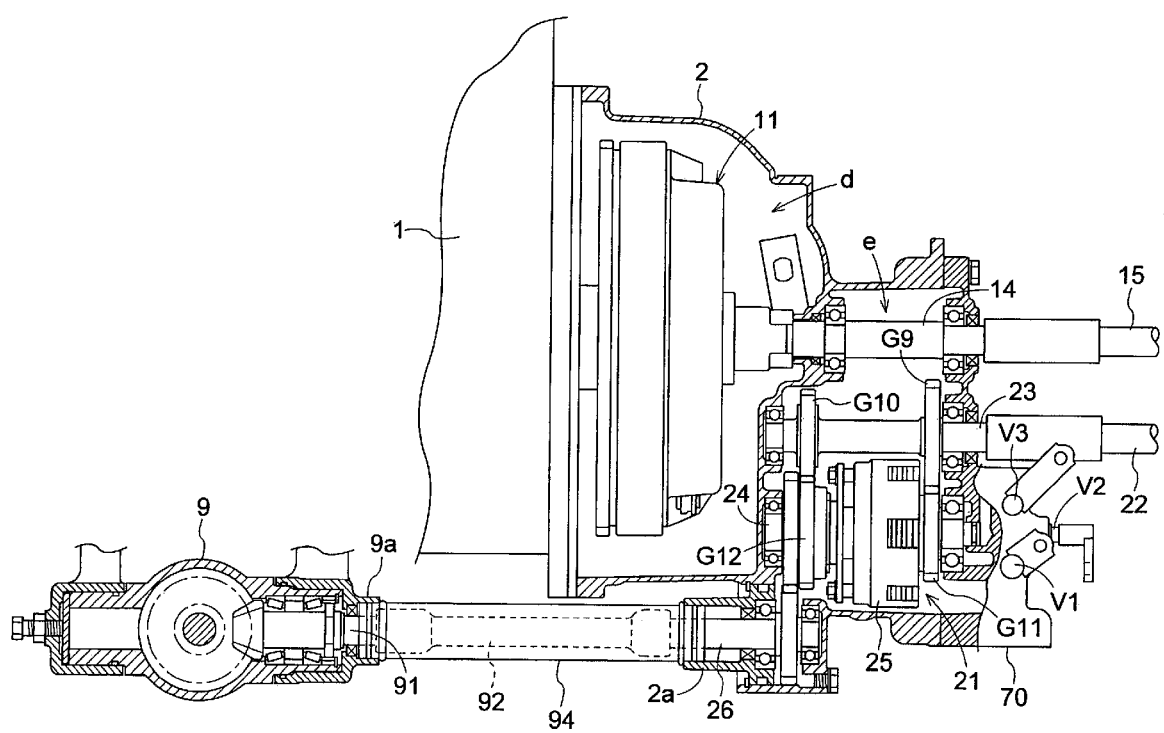
FIG. 2 is a side view in vertical section of a front wheel transmission system.

On the other hand, as shown in FIG. 2, the clutch housing 2 includes a dry type clutch chamber (d) accommodating the main clutch 11 and a wet type (oil bath lubricating) change speed chamber (e) separated therefrom. The latter change speed chamber (e) accommodates therein a front wheel change speed mechanism 21 for receiving the front wheel driving power from the front side of the front wheel drive transmission shaft 20. This front wheel change speed mechanism 21 includes an input shaft 23 coaxially coupled to the front wheel drive transmission shaft 20 via an intermediate shaft 22 and a change speed shaft 24 extending parallel therewith and having a change speed clutch 25. Then, by engaging or disengaging the change speed clutch 25, the change speed shaft 24 is speed changed in two steps of high and low and this speed changed power is gear-transmitted to a front wheel drive shaft 26 disposed at the lower end of the clutch housing 2, whereby the speed changed power (changed in the two speed of high and low) is shaft-transmitted to the front axle case 9.

Figure 6:
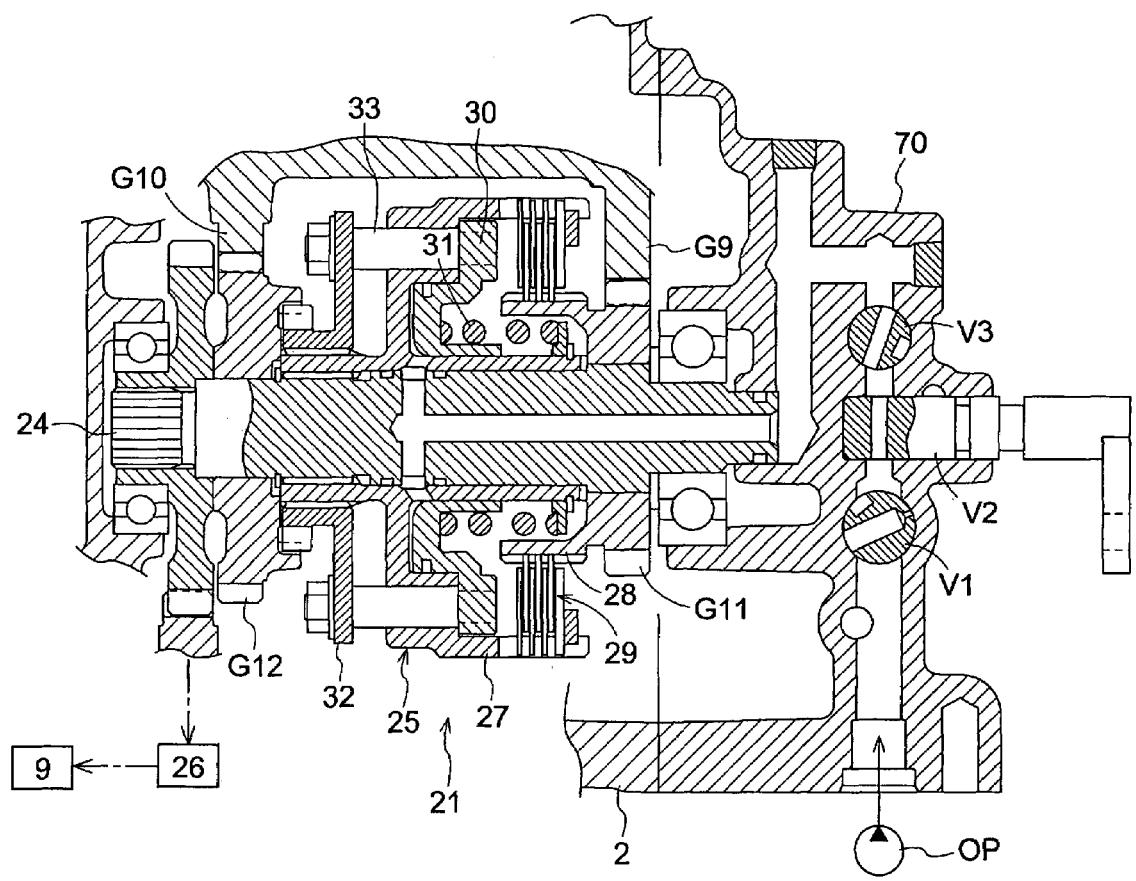
FIG. 6 is a side view in vertical section of a front wheel transmission system under a standard four wheel drive mode.

The above-described input shaft 23 mounts a large gear G9 and a small gear G10. Whereas, the change speed shaft 24 mounts a small free gear G11 and a large free gear G12 which are constantly meshed respectively with the gears G9, G10. Referring to the change speed clutch 25 provided on the change speed shaft 24, as shown in FIG. 6, a multiple plate type friction transmission unit 29 is interposed between a clutch drum 27 fixed on the change speed shaft 24 and a spline boss portion 28 formed continuously from the small free gear G11. And, as a piston member 30 fitted within the clutch drum 27 is displaced forwardly or rearwardly by means of pressure oil fed thereto and discharged therefrom via an inner shaft oil passage and a spring 31 incorporated therein, the friction transmission unit 29 is pressed or released from pressing, whereby this clutch is engaged or disengaged.

Further, a shift member 32 shiftably fitted on the boss portion of the clutch drum 27 is integrated with the piston member 30 via a connecting pin 33 extending through the clutch drum 27, so that the shift member 32 is shifted in association with the advancing or retracting movement of the piston member 30.

In operation, when the supply of pressure oil is blocked, as shown in FIG. 6, the piston member 30 is displaced rearward (retracted) to the left side in the figure by the urging force of the internal spring 31, whereby the change speed clutch 25 is "disengaged"; and also the shift member 32 formed integral with the piston member 30 is engaged, at its lateral face, with the large free gear G12. Hence, the power of the input shaft 23 is transmitted in reduced speed to the change speed shaft 24 via the small gear G10, the large free gear G12, the shift member 32 and the clutch drum 27. Then, this power is taken off from the front end of the change speed shaft 24 and transmitted eventually via the front wheel drive shaft 26 to the front axle case 9. In this case, the front wheels 8 are driven at a peripheral speed substantially equal to (or slightly higher than) a rear wheel peripheral speed, thereby to realize a standard four wheel drive mode.

Figure 7:
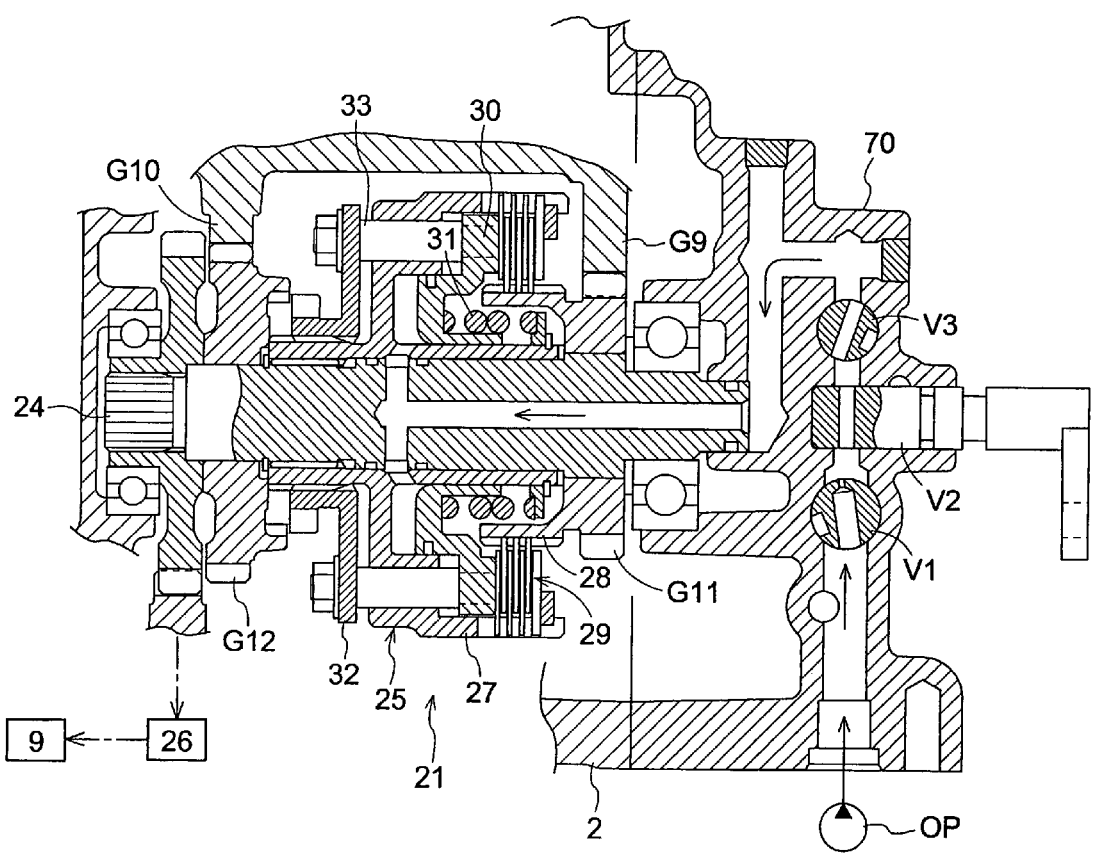
FIG. 7 is a side view in vertical section of the front wheel transmission system under a front wheel accelerated drive mode.

Further, as shown in FIG. 7, when in response to supply of pressure oil, the piston member 30 is moved to the right against the urging force of the spring 31 thereby to press the friction transmission unit 29, this renders the change speed clutch 25 into its "engaged condition" and also this shift member 32 formed integral with the piston member 30 is released from its meshing with the large free gear G12. Then, the power of the input shaft 23 is transmitted in acceleration to the change speed shaft 24 via the large gear G9, the small free gear G11, the friction transmission unit 29, and the clutch drum 27 and this power is transmitted eventually via the front wheel driven shaft 26 to the front axle case 9. In this case, the front wheels 8 are driven at a peripheral speed about twice the rear wheel peripheral speed, thereby to realize a front wheel accelerated drive mode.

Figure 8:
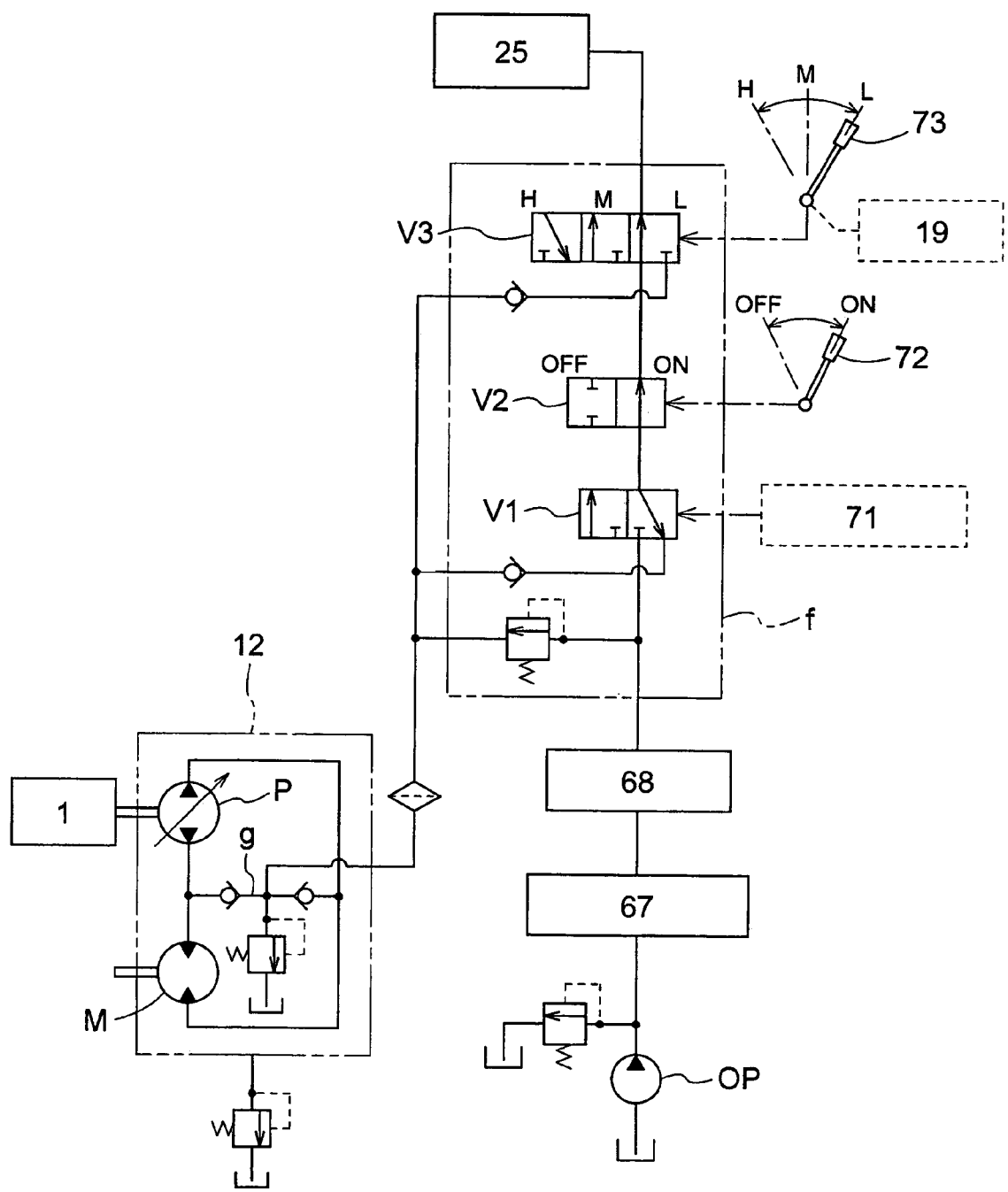
FIG. 8 is a hydraulic circuit diagram.

As shown in the hydraulic circuit diagram of FIG. 8, the oil feed/discharge passage of the change speed clutch 25 includes a front wheel control valve V1 which is switched over in response to steering of the front wheels 8, an automatic change speed selecting valve V2 for selectively engaging the automatic change speed (mode) for the front wheels 8 and a check valve V3 which is switched over in association with a change speed operation of the auxiliary gear change speed mechanism 19, with the valves V1, V2, V3 being connected in series. Pressure oil from a hydraulic pump OP which is driven by the power of the engine is caused to run through a power steering unit 67 and an oil cooler 68 and then fed to a front wheel change speed hydraulic circuit (f). Further, return oil from this front wheel change speed hydraulic circuit (f) is fed to a charge circuit (g) of the HST case 12.

As shown in FIGS. 6 and 7, the front wheel control valve V1, the automatic change speed selecting valve V2 and the check valve V3 are provided respectively as a rotary valve. And, these valves V1, V2, V3 are assembled and attached to a single valve casing 70 which is connected to the rear portion of the clutch housing 2. And, the front wheel control valve V1 and the check valve V3 are disposed parallel with each other; whereas, the automatic change speed selecting valve V2 disposed therebetween has its spool axis extending normal to the spool axes of the other valves V1, V2.

The front wheel control valve V1 is mechanically coupled to the steering mechanism 71 for the front wheels 8. In operation, the valve blocks the oil passage when the front wheels 8 are under straight traveling condition. Whereas, when the front wheels 8 are steered to the left or to the right by an angle greater than a predetermined set angle (e.g. 35°) from the straight traveling condition, the front wheel control valve V1 is rotated to open up the oil passage. The automatic speed change selecting valve V2 is link-connected to a switch lever 72. So that, at an automatic speed change (mode) "ON" position, the oil passage is opened. At an automatic speed change (mode) "OFF" position, the oil passage is blocked. Further, the check valve V3 is link-connected to an auxiliary change speed lever 73 for switching over the auxiliary gear change speed mechanism 19 for changing speed in the three steps. In operation, when the auxiliary gear change speed mechanism 19 is set at the "low speed" or "middle speed", the valve opens up the oil passage. Whereas, when the auxiliary gear change speed mechanism 19 is operated to the "high speed", the valve blocks the oil passage.

Therefore, when the automatic change speed selecting valve V2 is operated to the automatic change speed (mode) "ON" position to open up the oil passage and the auxiliary gear change speed mechanism 19 is operated to the "low speed" or "middle speed", so that the check valve V3 is opens up the oil passage, in this condition alone, the front wheel control valve V1 will be switched over in association with the steering of the front wheels 8 by an angle greater than the predetermined set angle, so that the pressure oil will be fed to the change speed clutch 25 to drive the front wheels in acceleration, thus allowing the vehicle to make a small turn smoothly. On the other hand, even when the automatic change speed selecting valve V2 is set to the automatic change speed "ON" position, if the auxiliary gear change speed mechanism 19 is set at the "high speed", the front wheel automatic acceleration drive will not be provided even if the front wheels 8 are steered by an angle greater than the set angle. Needless to say, when the automatic change speed selecting valve V2 is set to the automatic change speed (mode) "OFF" position, thereby to close the oil passage, the front wheel automatic acceleration will not be provided even in the case of such sharp front wheel steering as above.

Figure 9:
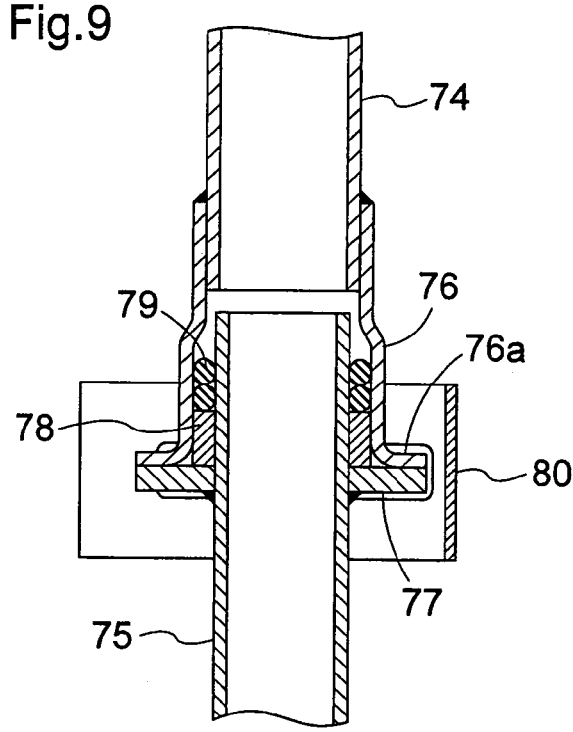
FIG. 9 is a vertical section showing a pipe connecting construction.
Figure 10:
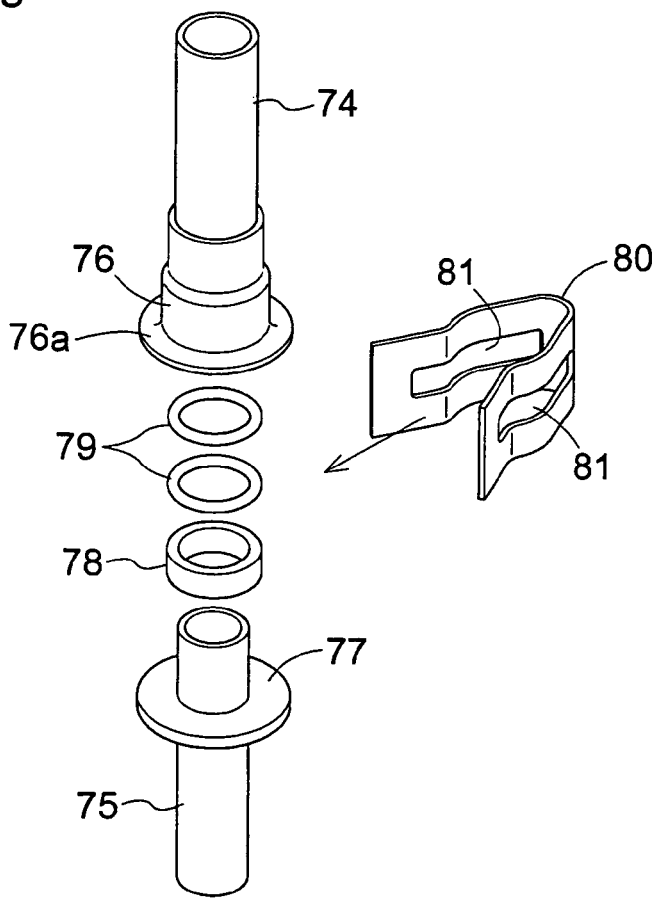
FIG. 10 is an exploded perspective view of the pipe connecting construction.

Incidentally, FIGS. 9 and 10 show a pipe connecting construction which allows easy and no-tool requiring connecting and separation of a pair of pipes 74, 75 forming a pressure oil feeding external pipe path in the above-described hydraulic circuit. More particularly, at an end of one pipe 74, there is provided a large-diameter connecting cylinder 76 having a flange 76a at its leading end. On the outer periphery of the other pipe 75, a flange plate 77 with a same diameter as the flange 76a is fixed by welding. For pipe connection, first, an axial alignment collar 78 and to O-rings 79 are fitted on the outer periphery of the other pipe 76. Then, under this fitted condition, the other pipe 75 is inserted and engaged to the large-diameter connecting cylinder 76, thereby to bring the flange 76a and the flange plate 77 into superposed abutment with each other. In this, as the axial alignment collar 78 is snugly engaged within the large-diameter connecting cylinder 76, the two pipes 74, 75 are connected coaxially, and sealed by the O-rings 79. Then, with the flange 76a and the flange plate 77 kept under the superposed abutment, a clip 80 formed by bending a plate spring into U-shape will be clamped to the flange connecting portion from its lateral side. This clip 80 defines slits 81 for engagement with the flange connecting portion. Hence, as the flange 76a and the flange plate 77 are retained at these slits 81, inadvertent separation of the two pipes 74, 75 is prevented.

Figure 11A:
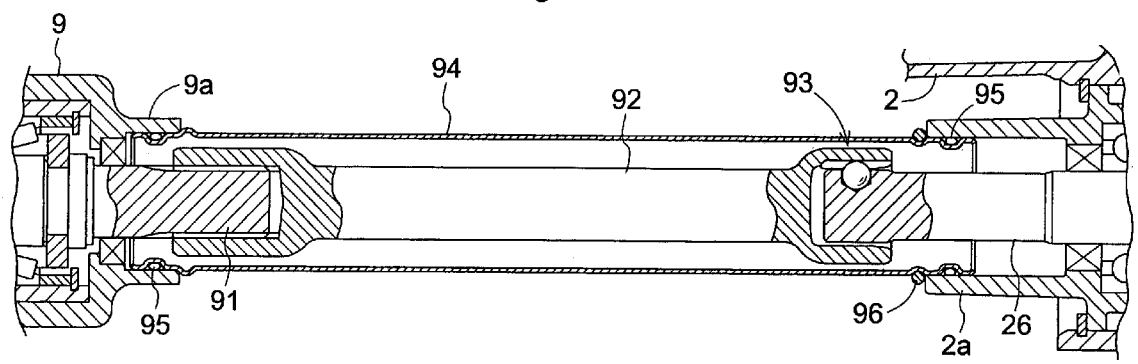
FIG. 11A is a side view in vertical section showing a covering construction for a front wheel drive transmission shaft.
Figure 11B:
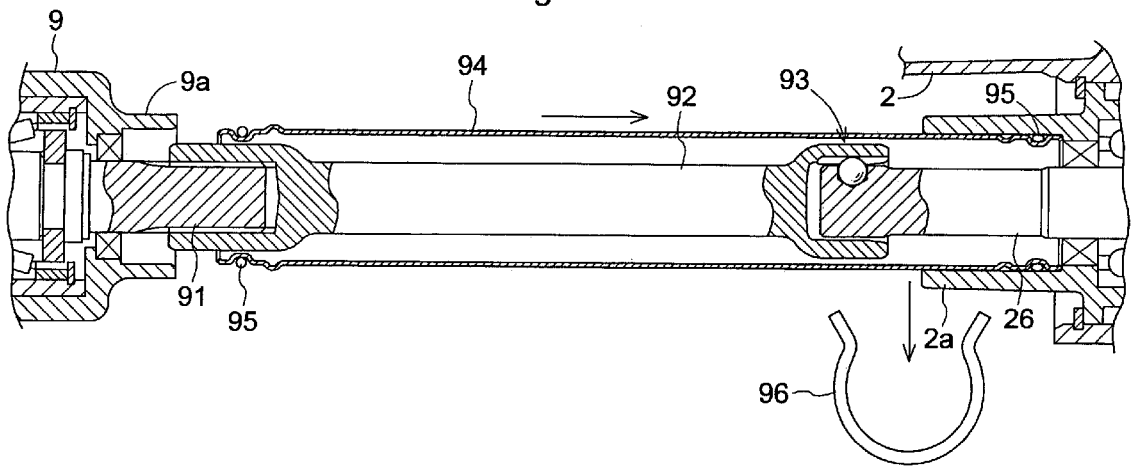
FIG. 11B is a side view in vertical section showing the covering construction for the front wheel drive transmission shaft.

FIGS. 11A and 11B show a construction for coaxial operative coupling between the front wheel drive shaft 26 and an input shaft 91 of the front axle case 9 via a transmission shaft 92. As shown, the front wheel drive shaft 26 and the rear end of the transmission shaft 92 are coupled to each other via a ball joint 93, and the front end of the transmission shaft 92 and the input shaft 91 are spline-connected to each other. Further, for preventing adhesion to or entrapment of a foreign object with the transmission shaft 92, opposed ends of a cylindrical cover 94 are fitted over and across a boss portion 2a provided at the lower portion of the clutch housing 2 and a boss portion 9a provided at the input portion of the front axle case 9, and a seal ring 95 is provided for water-tight sealing. As shown in FIG. 11A, under the above-described attached condition of the cylindrical cover 94, an annular projection 94a formed as a bulging portion adjacent the front end of the cover is placed in abutment against an end of the boss portion 9a of the front axle case 9, whereby forward displacement of the cylindrical cover 94 is prevented. Further, a stopper ring 96 fitted adjacent the rear end of the cylindrical cover 94 is placed in abutment against the front end of the boss portion 2a of the clutch housing 2, whereby rearward displacement of the cylindrical cover 94 is also prevented. With this construction, as shown in FIG. 11B, by removing the stopper ring 96 and pressing the cylindrical cover 94 into the boss portion 2a, the front portion of the transmission shaft 92 can be exposed. Then, by applying a tool such as a plier to thus exposed front portion of the transmission shaft 92, the transmission shaft 92 can be rotated to allow easy alignment of the spline.

Figure 12A:
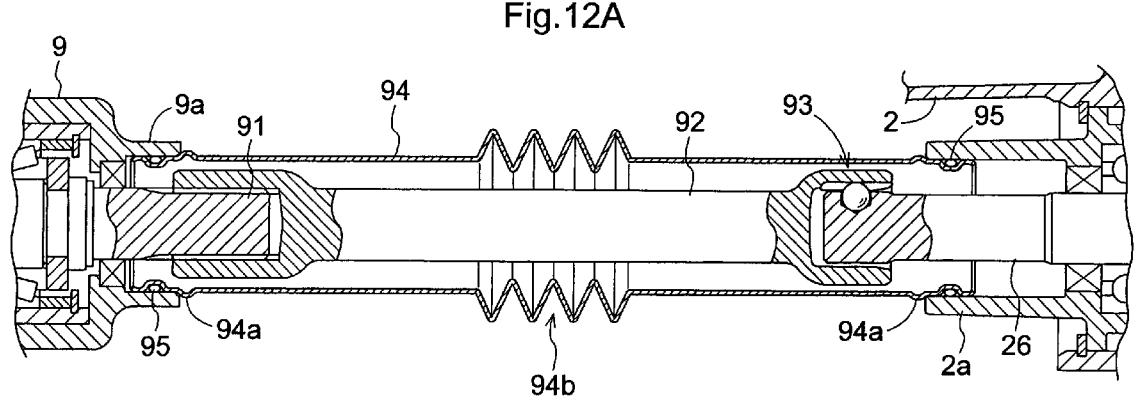
FIG. 12A is a side view in vertical section showing a covering construction for the front wheel drive transmission shaft relating to a further embodiment.
Figure 12B:
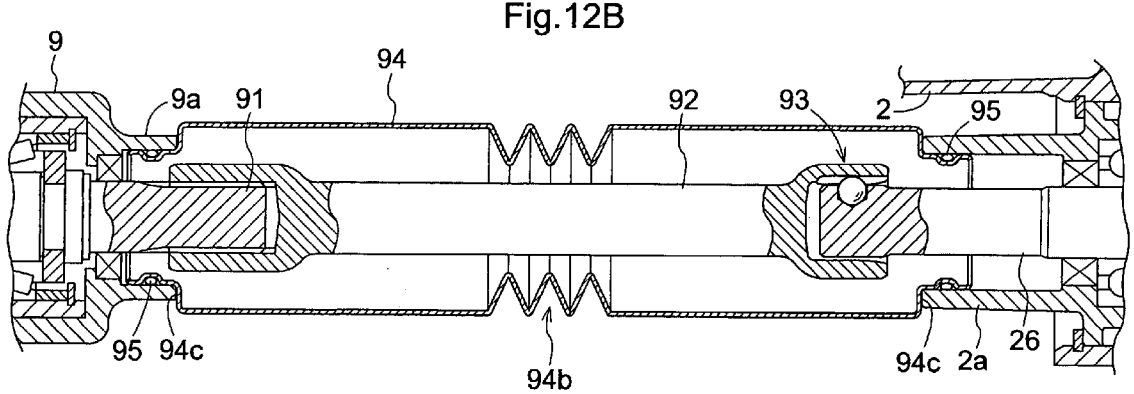
FIG. 12B is a side view in vertical section showing the covering construction for the front wheel drive transmission shaft relating to the further embodiment.

Incidentally, the means for covering the front portion of the transmission shaft 92 with the cylindrical cover 94 with allowing exposure of the front portion as needed is not limited to the above-described construction. For instance, as shown in FIG. 12A, an expandable/retractable bellows portion 94b may be formed at an intermediate portion of the cylindrical cover 94. So that, with expansion of the bellows portion 94b, the front and rear ends of the cylindrical cover 94 may be inserted respectively into the boss portions 9a, 2a and then this position is fixed by the annular projection 94a. Or, as shown in FIG. 12B, with expansion of the bellows portion 94b, the front and rear ends of the cylindrical cover 94 may be inserted respectively into the boss portions 9a, 2a and an annular step portion 94c is used for fixing this position.

Next, the PTO transmission line will be detailed.

A rear end of the input shaft 13 rotatably supported through the upper section of the HST case 12 is disposed in end-to-end relationship with a transmission shaft 35 acting as a receiving portion for the PTO transmission line and rotatably supported at the PTO line shaft bearing portion (b) formed in the intermediate partitioning wall 3a, and a hydraulically operated multiple plate PTO clutch 36 is interposed therebetween.

Figure 13:
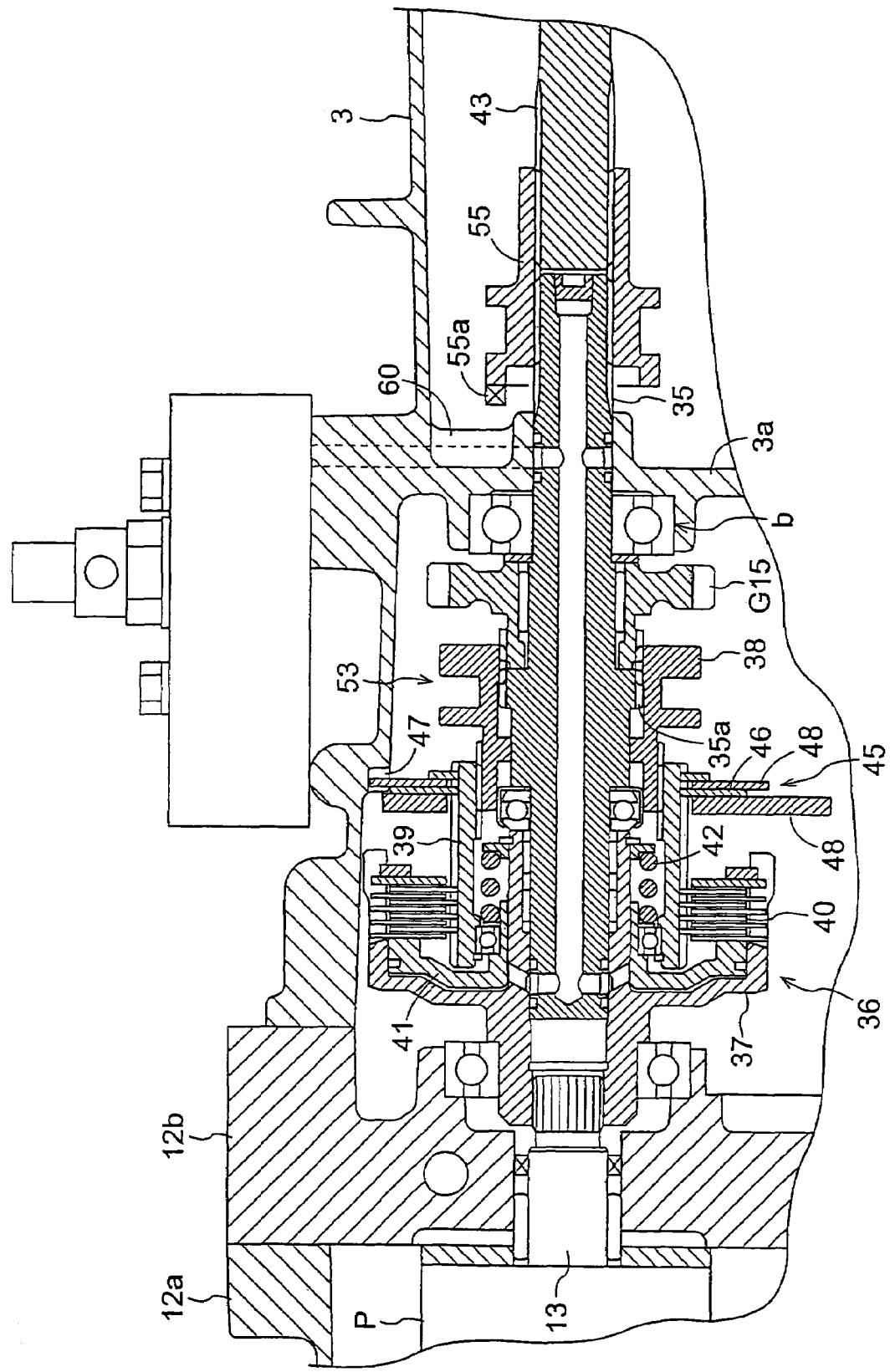
FIG. 13 is a side view in vertical section of a PTO mode selecting mechanism.

As shown in FIG. 13, the PTO clutch 36 includes, as principal components thereof, a clutch drum 37 splined to the rear end of the input shaft 13, a shift member 38 shiftably splined on the PTO transmission shaft 36, a clutch sleeve 39 splined on the shift member 38 to be shiftable relative thereto, a multiple plate friction transmission unit 40 interposed between the clutch drum 37 and the clutch sleeve 39, a clutch operating piston member 41 mounted within the clutch drum 37, a spring 42 for urging the piston member 41 in a friction releasing direction, etc. In operation, in response to supply of pressure oil via its inner shaft oil passage, the piston member 41 is displaced to the right side in the figure against the urging force of the spring 42, thereby a "clutch engaged" condition with the compressed condition of the friction transmission unit 40 is provided. Whereas, in response to release of pressure oil supply, the piston 41 is displaced to the left side in the figure by the urging force of the spring 42 incorporated therein, whereby a "clutch disengaged" condition with release of the compressed condition of the friction transmission unit 40 is provided.

Under the "clutch engaged" condition, the power transmitted to the clutch sleeve 39 is transmitted via the shift member 38 to the transmission shaft 35 and this power is transmitted via an intermediate transmission shaft 43 coaxially coupled to the rear end of the transmission shaft 35 to the rear portion of the differential case 5, in which the power is subjected to significant reduction by gears G13, G14 mounted at a rear portion of the differential case 5 and this speed reduced power is taken off from the rear PTO shaft 7.

Further, at a rear portion of the PTO clutch 36, there is provided a PTO braking mechanism 45 for preventing inertial rotation on the downstream of the transmission in operative association with the clutch disengaging operation. This PTO braking mechanism 45 includes a friction plate 46 splined on the clutch sleeve 38, a receiving member 47 fixed inside the transmission case 3 and a braking plate 48 non-rotatably retained and supported to the inside of the transmission case 3. In operation, when the PTO clutch 36 is disengaged and the piston member 41 is moved to the left by the urging force of the spring 42, the clutch sleeve 39 is moved in the same direction as and together with the piston member 41, so that the friction plate 46 becomes bound between the receiving member 47 an the braking plate 48, thus applying a braking force to the clutch sleeve 39.

As shown in FIG. 4, to the lower face of the transmission case 3 forwardly of the intermediate partitioning wall 3a, there is bolt-connected a mid PTO case 51 supporting a mid PTO shaft 50 projecting forwardly therethrough. Further, within the front space inside the transmission case 3 forwardly of the intermediate partitioning wall 3a, there are mounted a mid PTO transmission mechanism 52 for operatively coupling the transmission shaft 35 and the mid PTO shaft 50 via gears and a PTO mode selecting mechanism 53 for switching over between an power take-off condition from the rear PTO shaft 7 and power-take off condition from the mid PTO shaft 50.

Referring to the mid PTO transmission mechanism 52, a power take-off gear G15 loosely mounted on a rear portion of the transmission shaft 35 and a gear G16 formed integral with the mid PTO shaft 50 are operably coupled to each other via relay gears G17, G18, G19. Specifically, the relay gear G17 is loosely mounted on the front wheel drive transmission shaft 20, the relay gear G18 is loosely mounted on the transmission shaft 17, the relay gear 19 is loosely mounted on a support shaft 54 mounted to a lower wall portion of the transmission case 3. Incidentally, when the transmission case 3 is originally formed, an upper depth portion of a mounting seat 3b is closed with the bottom wall. However, in the case of the type adapted for attachment of the mid PTO case 51, the upper depth portion of the mounting seat 3b will be cut away.

Figure 14:
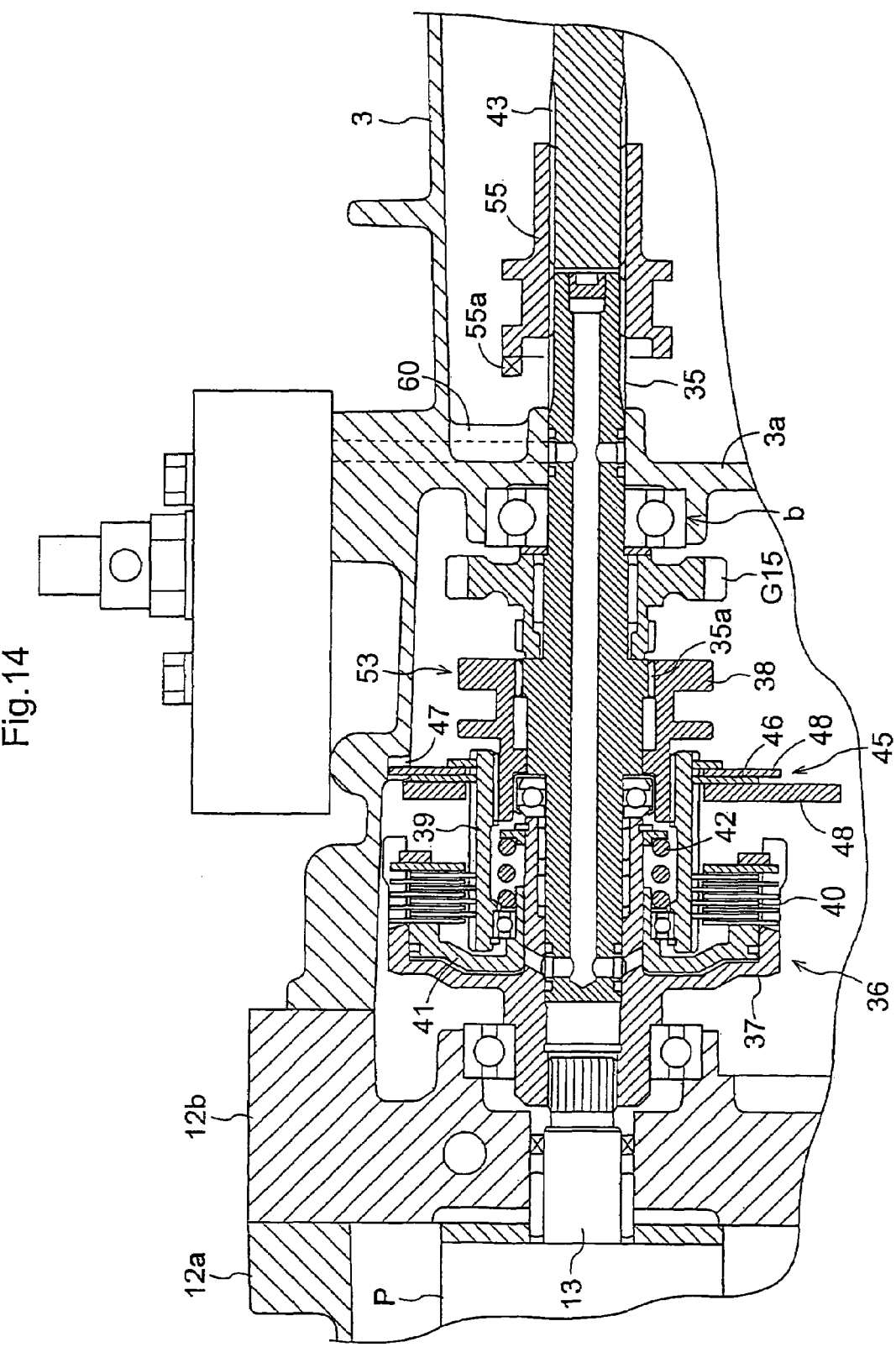
FIG. 14 is a side view in vertical section of the PTO mode selecting mechanism.

By shifting the shift member 38 forwardly or rearwardly, the above-described PTO mode selecting mechanism 53 provides a mode for transmitting power to the rear PTO shaft 7 alone, a further mode for transmitting the power to both the rear PTO shaft 7 and the mid PTO shaft 50 and a still further mode for transmitting the power to the mid PTO shaft 50 alone. More particularly, as shown in FIG. 14, when the shift member 38 is shifted to the most forward position, the shift member 38 becomes engaged only with a spline portion 35a of the transmission shaft 35, so that the power transmitted to the shift member 38 via the PTO clutch 36 is transmitted via the intermediate transmission shaft 43 to the rear PTO shaft 7 alone.

Also, when the shift member 38 is shifted to an intermediate position in the fore and aft direction, as shown in FIG. 13, the shift member 38 becomes spline-engaged with the spline portion 35a of the transmission shaft 35 and also with the boss portion of the power take-off gear G15, whereby the power transmitted to the shift member 38 via the PTO clutch 36 is transmitted via the intermediate transmission shaft 43 to the rear PTO shaft 7 and also transmitted via the mid PTO transmission mechanism 52 to the mid PTO shaft 50.

Figure 15:
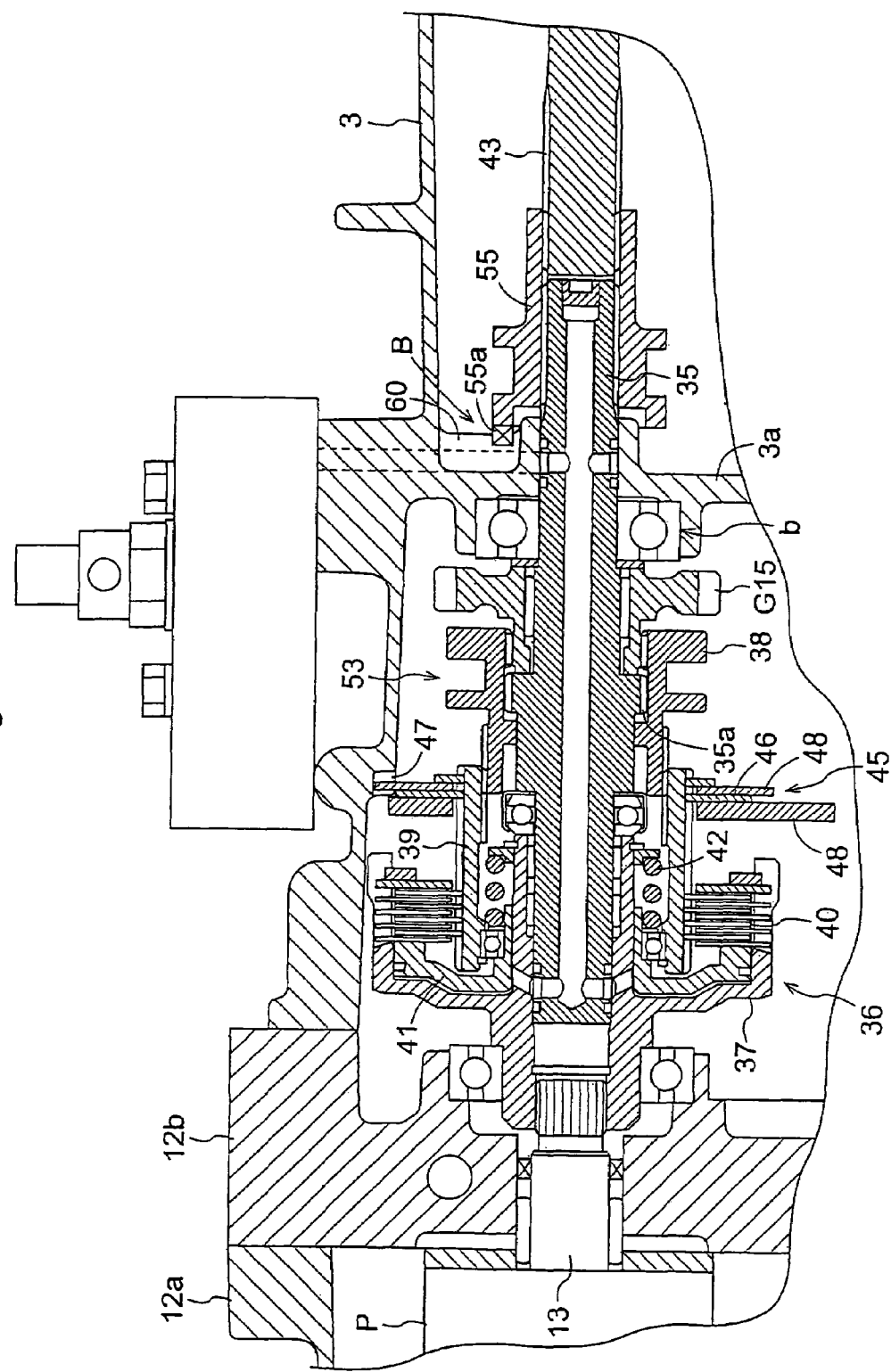
FIG. 15 is a side view in vertical section of the PTO mode selecting mechanism.

Further, as shown in FIG. 15, when the shift member 38 is shifted to the most rearward position, the shift member 38 becomes spline-engaged only with the boss portion of the power take-off gear G15, so that the power transmitted to the shift member 38 via the PTO clutch 36 is transmitted via the PTO transmission mechanism 52 to the mid PTO shaft 50 alone.

In the above, a shaft connecting sleeve 55 splined on and across the transmission shaft 35 and the intermediate transmission shaft 43 functions as a PTO brake (B) for preventing unneeded co-rotation of the rear PTO shaft 7 which has been rendered freely rotatable in response to the selection by the PTO mode selecting mechanism 53 of the mode for driving the mid PTO shaft 50 alone.

More particularly, the shaft connecting sleeve 55 is spline-mounted to be shiftable in the fore and aft direction. And, its operational line is constructed such that this shaft connecting sleeve 55 may be shifted in the reverse direction in synchronism with the shift member 38 for the PTO mode selection.

Figure 16:
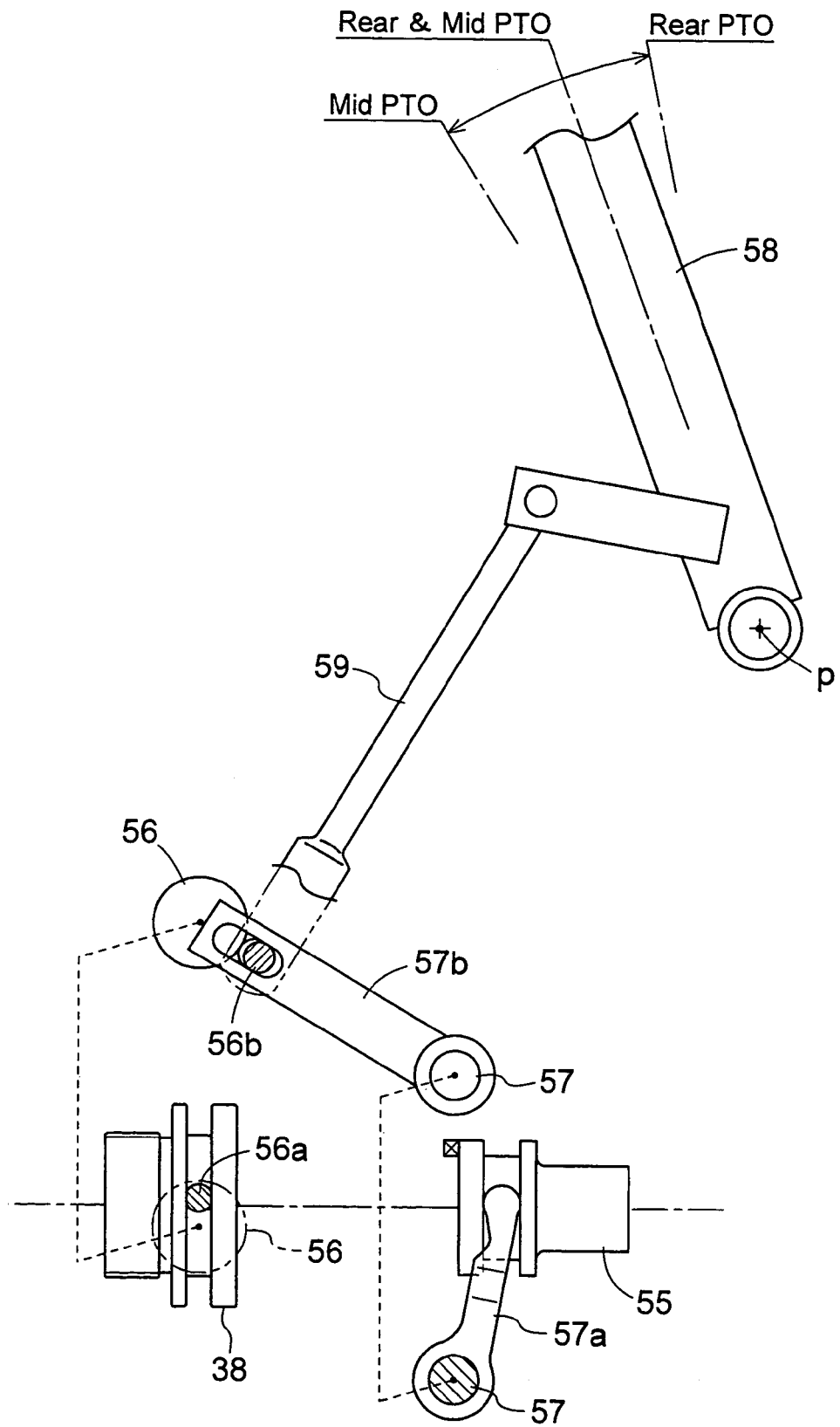
FIG. 16 is a side view showing an operational construction for the PTO mode selecting mechanism.
Figure 17:
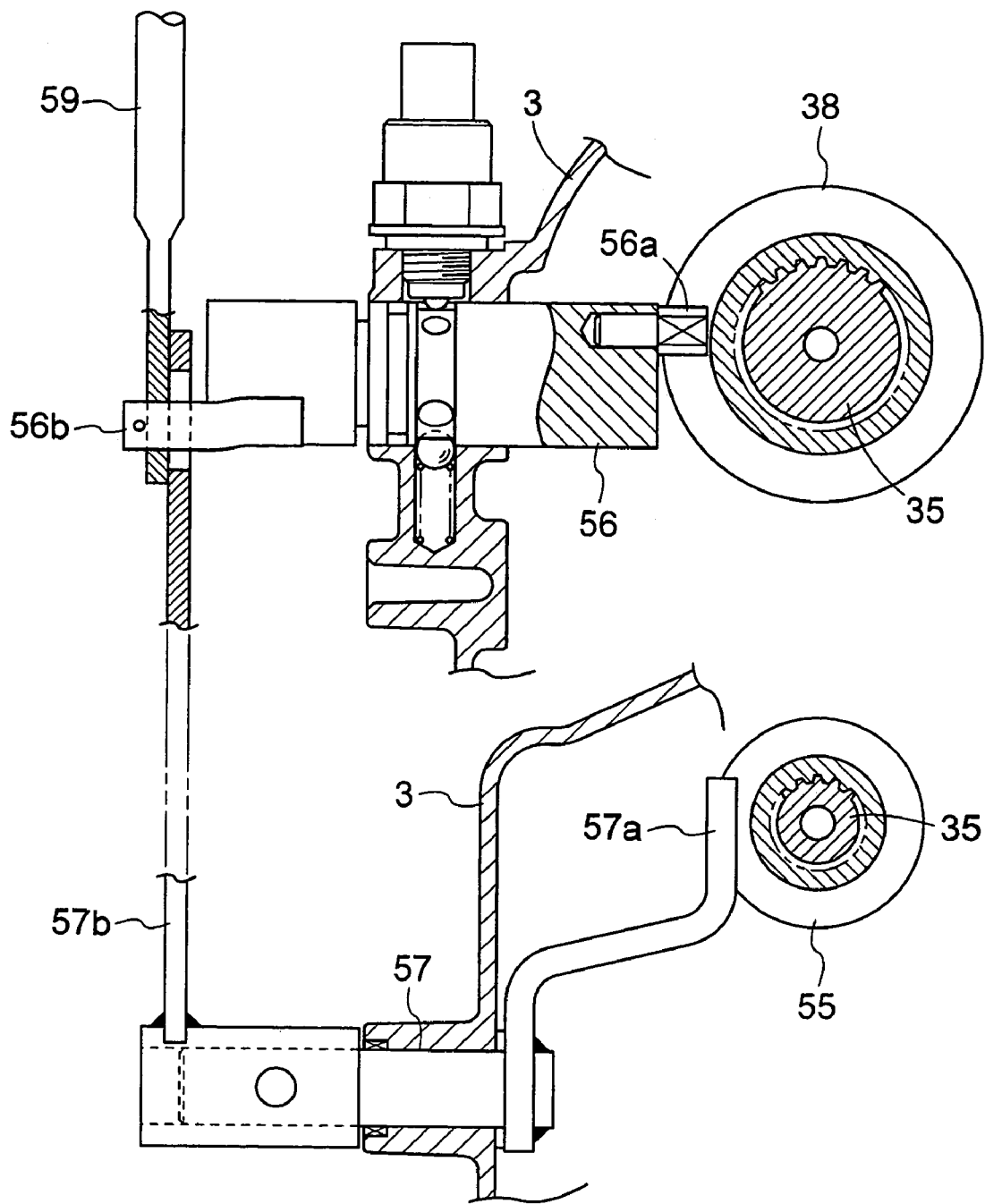
FIG. 17 is a front view showing the operational construction for the PTO mode selecting mechanism.

Namely, as shown in FIGS. 16 and 17, an operational shaft 56 having an eccentric operational pin 56*a* for engagement with the shift member 38 and an operational shaft 57 having an operational arm 57*a* for engagement with the shaft connecting sleeve 55 are supported to and through a lateral wall of the transmission case 3. And, an operational pin 56*b* provided on an outer end of the operational shaft 56 and a PTO mode selecting lever 58 pivotable in the forward and rearward directions about a pivot point (p) are operably coupled to each other via a rod 59. Further, a link lever 57*b* extending from the outer end of the operational shaft 57 and the operational pin 56*b* are coupled via an elongate slot. So that, in response to a forward or rearward pivotal operation of the PTO mode selecting lever 58, the shift member 38 and the shaft connecting sleeve 55 are shifted in opposite directions from each other.

Therefore, when the shift member 38 is shifted to the most forward position or the intermediate position, thus the transmission mode for driving the rear PTO shaft 7 alone or the further transmission mode for driving both the rear PTO shaft 7 and the mid PTO shaft 50 is selected, the shaft connecting sleeve 55 is located in its most rearward position or its fore and aft intermediate position within its shift range and in this condition, the shaft connecting sleeve 55 functions merely as a shaft coupling. Whereas, as shown in FIG. 15, when the shift member 38 is shifted to its most rearward position, thus selecting the still further transmission mode for driving the mid PTO shaft 50 alone, in operative association with this rearward shift of the shift member 38, the shaft connecting sleeve 55 is shifted forward, so that a front end engaging pawl 55*a* of the shaft connecting sleeve 55 becomes engaged with a rib 60 from its rear side, which rib 60 is formed in the rear face of the intermediate partitioning wall 3*a* of the transmission case 3, whereby the PTO brake (B) is activated to prevent co-rotation of the transmission shaft 35 and the intermediate transmission shaft 43 which have been rendered freely rotatable.

SECOND EXAMPLE

Figure 18:
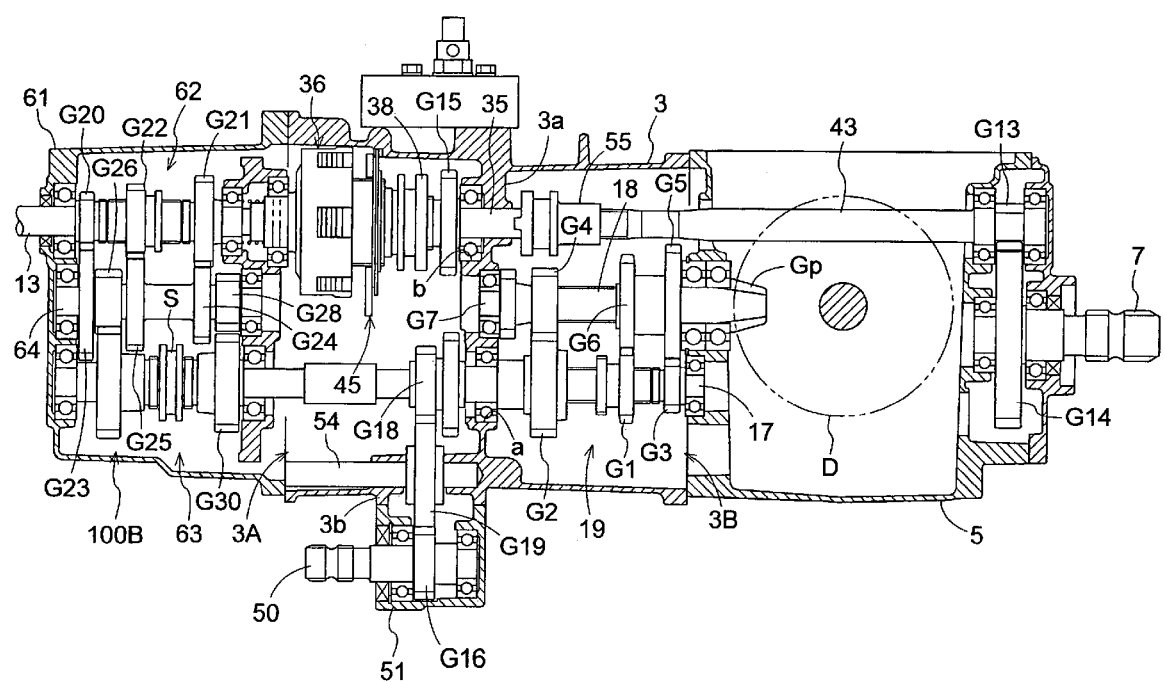
FIG. 18 is a side view in vertical section showing a second example of a transmission system.
Figure 19:
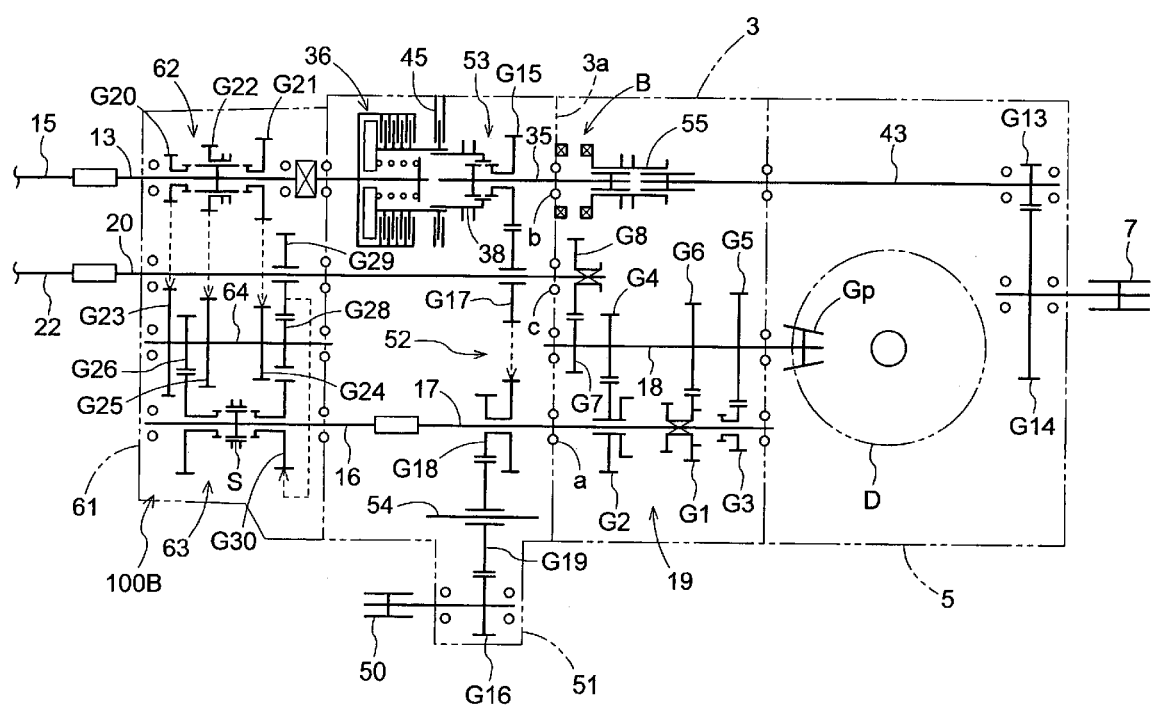
FIG. 19 is a schematic showing a gear train of the second example of the transmission system.

FIGS. 18 and 19 show a second example of transmission system which is adapted for using the same clutch housing 2, the same transmission case 3, and the same differential case 5 as the first example transmission system described above. In this example, to the front end of the transmission case 3, instead of the HST case 12 described above, a gear change speed case 61 accommodating a gear change speed mechanism 100B is connected. The rest of the construction of this second example is same as that of the first example. The gear change speed mechanism 61 incorporates therein a main gear change speed unit 62 and a forward/reverse switching unit 63.

The main gear change speed unit 62 is configured to change the engine power inputted to the input shaft 13 in three steps and transmit this speed changed power to an intermediate shaft 64. Hence, this gear change speed case 61 is capable of effecting main change speed operation for selectively providing one of three forward speeds and three reverse speeds.

More particularly, the input shaft 13 of the main gear change speed unit 62 mounts a small free gear G20 and a large free gear G21 and a middle-sized shift gear G22 is splined on this shaft 13 between these two free gears G20, G21. On the other hand, the intermediate shaft 64 fixedly mounts a large gear G23 and a small gear G24 which are constantly meshed respectively with the small free gear G20 and the large free gear G21, and a mid (medium-sized) gear G25 capable of being meshed with the shift gear G22. In operation, when the shift gear G22 is shifted to the forward position to be spline-engaged with the boss portion of the small free gear G20, the power is transmitted at a low speed (first speed) to the intermediate shaft 64 via the small free gear G20 and the large gear G23. When the shift gear G22 is shifted to the fore and aft intermediate position to be directly meshed with the mid gear G25, the power is transmitted at a medium speed (second speed) to the intermediate shaft 64. Further, when the shift gear 22 is shifted to the rear position to be spline-engaged with the boss portion of the large free gear G21, the power is transmitted at a high speed (third speed) to the intermediate shaft 64 via the large free gear G21 and the small gear G24.

The output shaft 16 mounts a forward transmission free gear G27 constantly meshed with a gear G26 of the intermediate shaft 64 and a reverse transmission free gear G30 constantly meshed with a gear G28 of the intermediate shaft 64 via a reverse gear G29. Further, a shift sleeve (S) is splined on this output shaft 16. In operation, when this shift sleeve (S) is shifted to be selectively engaged with a boss portion of the forward transmission free gear G27 or a boss portion of the reverse transmission free gear G30, the speed changed power of the intermediate shaft 64 is transmitted in the forward or reverse direction to the output shaft 16.

THIRD EXAMPLE

Figure 20:
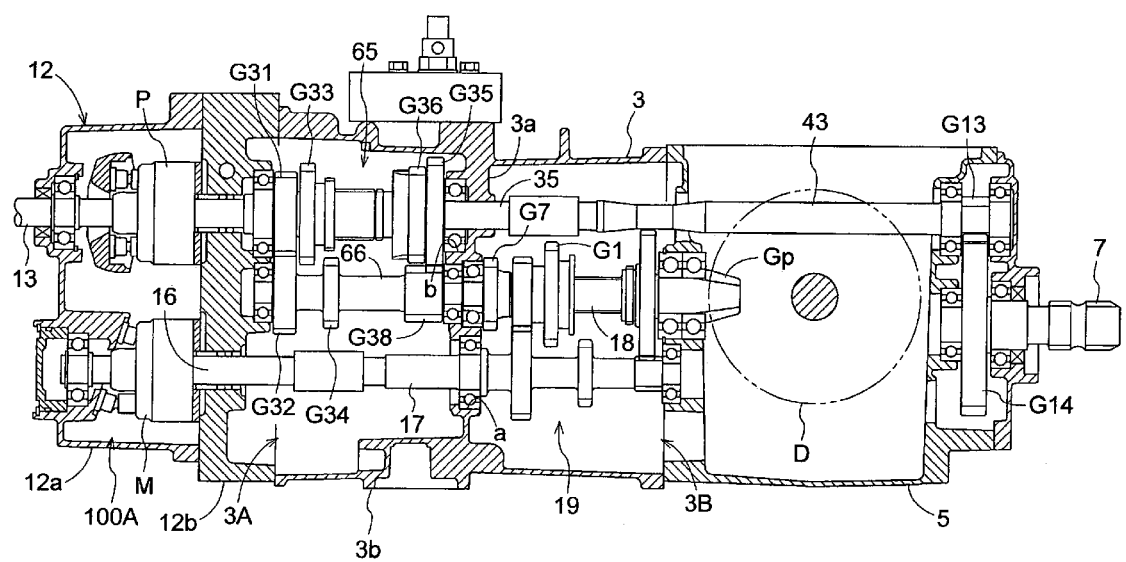
FIG. 20 is a side view in vertical section showing a third example of a transmission system.
Figure 21:
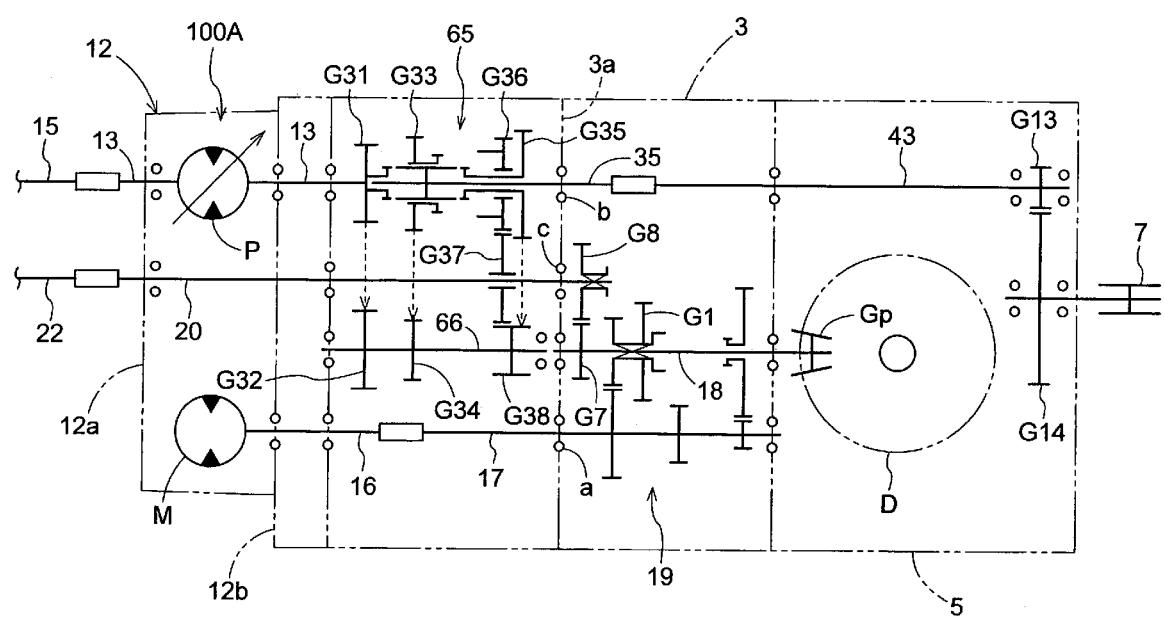
FIG. 21 is a schematic showing a gear train of the third example of the transmission system.

FIGS. 20 and 21 show a third example of transmission system which is adapted for using the same clutch housing 2, the same transmission case 3, and the same differential case 5 as the first example transmission system described above. In this example, to the front end of the transmission case 3, there is connected the HST case 12 described in the first example. above. In addition, the PTO transmission line housed in the front space of the case 3 forwardly of the intermediate partitioning wall 3*a* includes a gear type PTO change speed mechanism 65. Further, the traveling transmission line housed in the rear space of the case 3 rearwardly of the intermediate partitioning wall 3*a* includes the auxiliary gear change speed mechanism 19.

Further, the PTO transmission line in the example does not include the mid PTO shaft 50 and the upper depth portion of the mount seat 3*b* of the mid PTO case 51 is not cutaway to be opened, but used in the original closed condition at the time of its formation.

The PTO change speed mechanism 65 includes the transmission shaft 35 and a change speed shaft 66. Further, the rear end of the input shaft 13 projecting rearward from the HST case 12 is operably coupled to the change speed shaft 66 via gears G31, G32 Further, a shift gear G33 is splined on the transmission shaft 35. In operation, by shifting this shift gear G33, there can be provided three forward speeds and one reverse speed selectively.

More particularly, when the shift gear G33 is shifted to the most forward, third forward speed position, the shift gear G33 becomes coaxially spline-engaged with the boss portion of the input gear G31, whereby the input shaft 13 and the transmission shaft 35 are directly coupled with each other and the rear PTO shaft 7 is driven at the forward third speed (forward high speed). When the shift gear G33 is shifted rearward from the forward third speed position into the forward second speed position, the shift gear G33 becomes directly meshed with a gear G34 fixedly mounted on the change speed shaft 66, whereby the transmission shaft 35 is driven in the forward direction via the two gear meshings and the rear PTO shaft 7 is driven at the forward second speed (forward middle speed). Further, when the shift gear G33 is shifted rearward from the forward second speed position to the forward first speed position, the shift gear G33 becomes coaxially spline-engaged with the boss portion of a gear G35 loosely mounted on the transmission shaft 35. As a result, the transmission shaft 35 is driven in the forward direction via the two gear meshings and the rear PTO shaft is driven at the forward first speed (forward low speed). Moreover, when the shift gear G33 is shifted rearward from the forward first speed position into the reverse position, the shift gear G33 becomes coaxially spline-engaged with the boss portion of a gear G36 loosely mounted on the boss portion of the gear G35. This gear G36 is operably meshed, via a free gear G37, with a gear G38 of the change speed shaft 66. As a result, via the three gear meshings, the transmission shaft 35 is driven in the reverse direction and the rear PTO shaft 7 is driven in the reverse direction.

Incidentally, the auxiliary gear change speed mechanism 19 included in the traveling transmission line of this example effects three speeds change speed operation, like the first and second examples described above. However, in the foregoing examples, the shift gear G1 is mounted on the transmission shaft 17 which is a driving shaft. Whereas, in this example, the shift gear G1 is mounted on the bevel pinion shaft 18 which is a driven shaft.

FOURTH EXAMPLE

Figure 22:
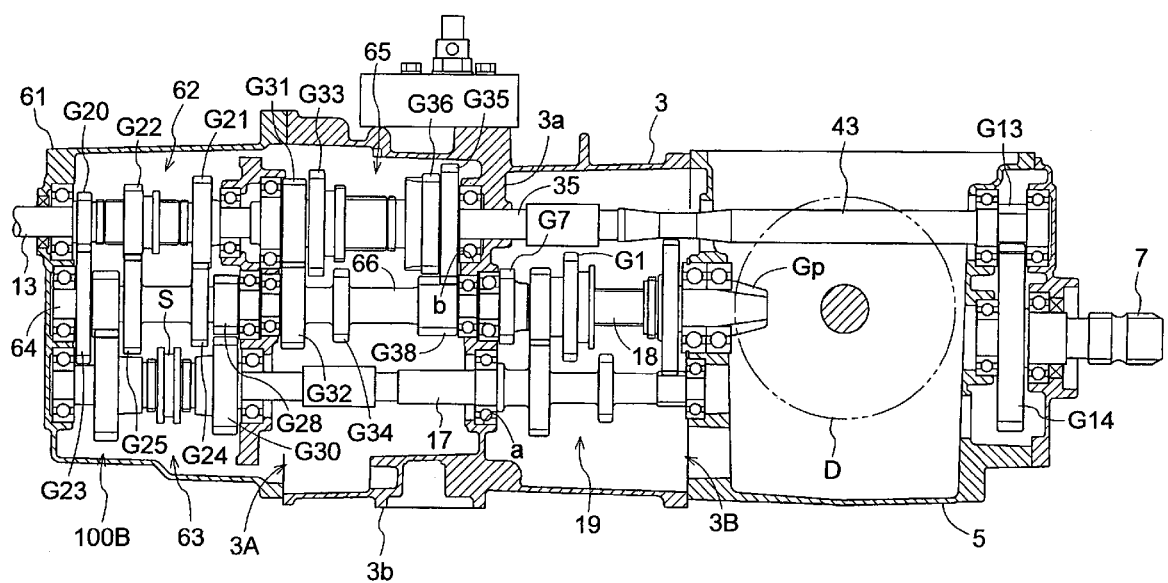
FIG. 22 is a side view in vertical section showing a fourth example of a transmission system.
Figure 23:
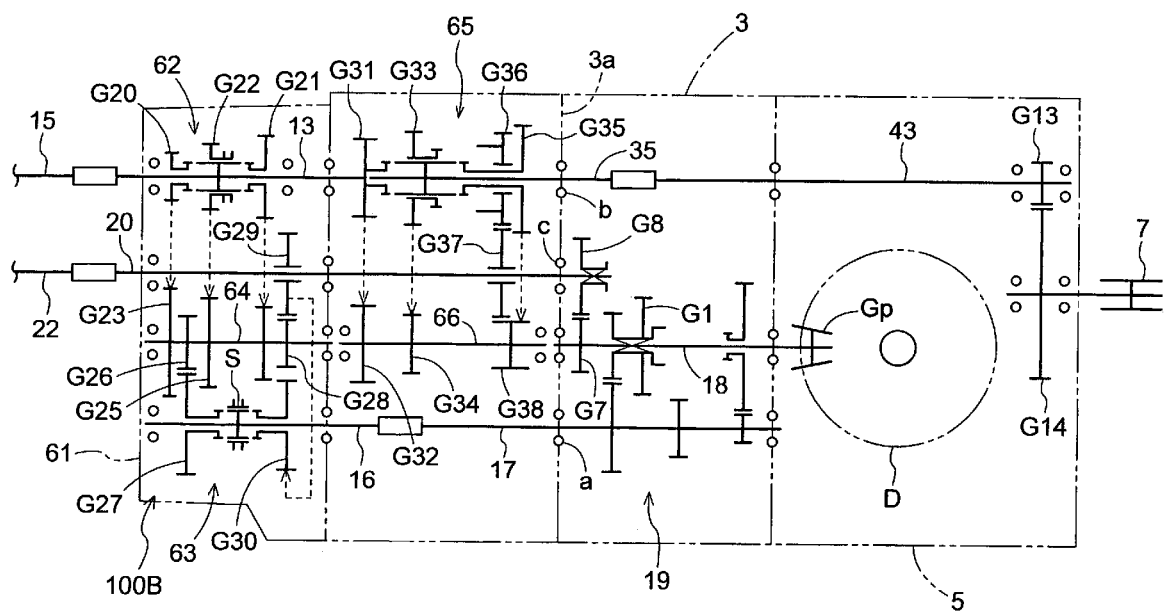
FIG. 23 is a schematic showing a gear train of the fourth example of the transmission system.

FIGS. 22 and 23 show a fourth example of transmission system which is adapted for using the same clutch housing 2, the same transmission case 3, and the same differential case 5 as the first example transmission system described above. In this example, in the construction of the third example, to the front end of the transmission case 3, there is connected the gear change speed case 61 described in the second example. Like the second example, the transmission system of this fourth example is capable of traveling change speed operation in 9 speeds in the forward direction and 9 speeds in the reverse direction. Further, like the third example, this transmission system is capable of PTO change speed operation in 3 speeds in the forward direction and 1 speed in the reverse direction.

OTHER EMBODIMENTS

In the foregoing respective embodiments, the vehicle body is formed by connecting the rear end of the housing frame 4 formed of plate metal to the HST case 12 connected to the front end of the transmission case 3 or to the gear change speed mechanism 61. Instead, the present invention may be embodied in a form of connecting the rear end of the housing frame 4 directly to the transmission case 3.

The invention claimed is:

1. A transmission system for a tractor, adapted for transmitting power of an engine to axles through a traveling transmission line and also to an externally mounted utility implement through a PTO transmission line, the system comprising:
    a clutch housing disposed rearwardly of the engine;
    a main transmission shaft extending from the clutch housing for transmitting power from the engine;
    a base transmission case disposed and spaced rearwardly of the clutch housing;
    the clutch housing and the base transmission case being connected together via a housing frame,
    the base transmission case including an intermediate partitioning wall for partitioning an inner space of the case in a fore and aft direction to create a front space having a front end opening and a rear space having a rear end opening;
    a differential case connected to the rear end opening of the base transmission case;
    a receiving portion for the traveling transmission line and a receiving portion for the PTO transmission line provided in the front space, said traveling and PTO transmission lines being disposed parallel with each other;
    a gear change speed module having a gear change speed case and a gear change speed mechanism for changing speed of the engine power and outputting the speed-changed power wherein the gear change speed case is configured to support the gear change speed mechanism and has a rear end and a gear module input shaft projecting forwardly from the gear change speed case, the gear module input shaft adapted to be operatively connected to the main transmission shaft to receive power from the engine; and
    an HST module having an HST case and an HST mechanism for changing speed of the engine power wherein the HST case is configured to support the HST mechanism and has a rear end and an HST module input shaft projecting forward from the HST case, the HST module input shaft adapted to be operatively connected to the main transmission shaft to receive the power from the engine;
    wherein said front end opening is adapted to selectively connect with either the rear end of the gear change speed module or the rear end of the HST module; wherein:
    when the gear change speed module is selectively used, a PTO power output portion of the gear change speed mechanism is connected end-to-end to the receiving portion for the PTO transmission line and a traveling power output portion of the gear change speed mechanism is connected end-to-end to the receiving portion for the traveling transmission line; and
    when the HST module is selectively used, a pump shaft of the HST mechanism is connected end-to-end to the receiving portion for the PTO transmission line and a motor shaft of the HST mechanism is connected end-to-end to the receiving portion for the traveling transmission line.

2. The transmission system according to claim 1, wherein said gear change speed mechanism includes a main gear change unit, a forward/reverse switchover unit, and an intermediate transmission shaft operably coupling between the main gear change speed unit and the forward/reverse switchover unit, and an input shaft of the main gear change speed unit is a traveling power output portion of the gear change speed mechanism and an output shaft of the forward/reverse switchover unit is a traveling power output portion of the gear change speed mechanism.

3. The transmission system according to claim 1, wherein an auxiliary gear change speed mechanism constituting a part of the traveling transmission line is disposed within the rear space.

4. The transmission system according to claim 1, wherein a PTO clutch constituting a part of the PTO transmission line is disposed within the front space.

5. The transmission system according to claim 1, wherein a mounting seat for a mid PTO case constituting a part of the PTO transmission line is formed on the lower end of the base transmission case.

6. The transmission system according to claim 4, wherein in the front space and on the downstream of the PTO clutch, there is mounted a PTO mode selecting mechanism for switching over between power take-off from a rear PTO shaft and power take-off from a mid PTO shaft.

7. The transmission system according to claim 1, wherein said gear change speed case and said HST case are configured for allowing a front wheel drive transmission shaft to extend therethrough in the fore and aft direction.

8. The transmission system according to claim 1 wherein the PTO transmission line is located above the traveling transmission line.

9. The transmission system according to claim 1, wherein the gear change speed case has a front wall that supports bearings for supporting the gear module input shaft and that covers an entire front of the gear change speed case.

10. The transmission system according to claim 1, wherein the HST case has a front wall that supports bearing for supporting the HST module input shaft and that covers an entire front of the HST case.

11. A transmission system for a tractor, adapted for transmitting power of an engine to axles through a traveling transmission line and also to an externally mounted utility implement through a PTO transmission line, the system comprising:
   a clutch housing disposed rearwardly of the engine;
   a base transmission case disposed and spaced rearwardly of the clutch housing;
   the clutch housing and the base transmission case being connected together via a housing frame,
   a differential case connected to a rear end opening of the base transmission case;
   a receiving portion for the traveling transmission line and a receiving portion for the PTO transmission line, said traveling and PTO transmission lines being disposed parallel with each other;
   a rear PTO shaft and a mid PTO shaft as an output portion of the PTO transmission line;
   a PTO clutch constituting a part of the PTO transmission line and disposed within the base transmission case, the PTO clutch being a multiple plate type clutch that can selectively transmit power from the engine or not transmit; and
   a PTO mode selecting mechanism disposed coaxially with and downstream of the PTO clutch inside the base transmission case, the PTO mode selecting mechanism controlling power transmission to the rear PTO shaft and the mid PTO shaft.

12. The transmission system according to claim 11, further comprising a PTO brake for preventing rotation of the rear PTO shaft in association with selection by the PTO mode selecting mechanism of a mode for transmitting the power to the mid PTO shaft alone.

13. The transmission system according to claim 12, wherein the PTO mode selecting mechanism is located between the PTO clutch and the PTO brake.

14. A transmission system for a tractor, adapted for transmitting power of an engine to axles through a traveling transmission line and also to an externally mounted utility implement through a PTO transmission line, the system comprising:
   a clutch housing disposed rearwardly of the engine;
   a base transmission case disposed and spaced rearwardly of the clutch housing;
   the clutch housing and the base transmission case being connected together via a housing frame,
   a differential case connected to a rear end opening of the base transmission case;
   a receiving portion for the traveling transmission line and a receiving portion for the PTO transmission line, said traveling and PTO transmission lines being disposed parallel with each other;
   a rear PTO shaft and a mid PTO shaft as an output portion of the PTO transmission line;
   a PTO clutch constituting a part of the PTO transmission line and disposed within the base transmission case, the PTO clutch being a multiple plate type clutch that can selectively transmit power from the engine or not transmit;
   a PTO braking mechanism disposed coaxially with and downstream of the PTO clutch inside the base transmission case for preventing an inertial rotation of a member downstream of the PTO braking mechanism when the PTO clutch is disengaged;
   a PTO mode selecting mechanism disposed coaxially with and downstream of the PTO clutch inside the base transmission case, the PTO mode selecting mechanism controlling power transmission to the rear PTO shaft and the mid PTO shaft, the PTO mode selecting mechanism is switchable between a first mode wherein power is transmitted only to the rear PTO shaft, a second mode wherein power is transmitted to rear PTO shaft and the mid PTO shaft, and third mode wherein power is transmitted only to the mid PTO shaft;
   a PTO brake for preventing rotation of the rear PTO shaft in association with selection of the third mode of the PTO mode selecting mechanism for transmitting power to the mid PTO shaft alone.

15. The transmission system according to claim 14, further comprising a PTO brake for preventing rotation of the rear PTO shaft in association with selection by the PTO mode selecting mechanism of a mode for transmitting the power to the mid PTO shaft alone.

16. The transmission system according to claim 15, wherein the PTO mode selecting mechanism is located between the PTO clutch and the PTO brake.

* * * * *